United States Patent
Du et al.

(10) Patent No.: US 10,728,779 B2
(45) Date of Patent: Jul. 28, 2020

(54) CHANNEL MEASUREMENT METHOD AND APPARATUS

(71) Applicant: Huawei Technologies Co., Ltd., Shenzhen (CN)

(72) Inventors: Zhenguo Du, Shenzhen (CN); Ping Fang, Shenzhen (CN); Zhigang Rong, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/328,867

(22) PCT Filed: Aug. 31, 2016

(86) PCT No.: PCT/CN2016/097750
§ 371 (c)(1),
(2) Date: Feb. 27, 2019

(87) PCT Pub. No.: WO2018/040046
PCT Pub. Date: Mar. 8, 2018

(65) Prior Publication Data
US 2019/0191325 A1  Jun. 20, 2019

(51) Int. Cl.
*H04W 24/08* (2009.01)
*H04L 5/00* (2006.01)
(Continued)

(52) U.S. Cl.
CPC .............. *H04W 24/08* (2013.01); *H04L 5/00* (2013.01); *H04W 72/085* (2013.01); *H04B 17/318* (2015.01)

(58) Field of Classification Search
None
See application file for complete search history.

(56) References Cited

U.S. PATENT DOCUMENTS 8,982,793 B2   3/2015  Park et al.
2012/0327914 A1* 12/2012  Kang .................... H04L 5/0023
                                                              370/336
(Continued)

FOREIGN PATENT DOCUMENTS

CN   102238565 A   11/2011
CN   102687422 A   9/2012
(Continued)

OTHER PUBLICATIONS

IEEE Std 802.11ac-2013 Part 11: Wireless LAN Medium Access Control (MAC) and Physical Layer (PHY) Specifications-Amendment 4: Enhancements for Very High Throughput for Operation in Bands below 6 GHz, IEEE Computer Society, Dec. 11, 2013, 424 pages.
(Continued)

*Primary Examiner* — Scott M Sciacca
(74) *Attorney, Agent, or Firm* — Slater Matsil, LLP

(57) ABSTRACT

A method includes: sending, by an AP, a channel measurement notification message, where the channel measurement notification message includes a STA indication and a to-be-measured channel indication; receiving, by the AP, channel sounding signals sent by M STAs, where the M STAs that need to measure a channel are divided into W groups, N STAs in a same group simultaneously send channel sounding signals on a same sub-channel in the V to-be-measured sub-channels, the channel sounding signal includes a plurality of subcarriers, every Ng consecutive subcarriers are a group of subcarriers, each STA in each group occupies a subcarrier at a fixed location in each group of subcarriers, and subcarriers that are occupied by the N STAs in the same group and that are in a same group of subcarriers are different from each other.

21 Claims, 17 Drawing Sheets

(51) Int. Cl.
*H04B 17/318* (2015.01)
*H04W 72/08* (2009.01)

(56) References Cited

U.S. PATENT DOCUMENTS

| | | | |
|---|---|---|---|
| 2014/0086200 A1 | 3/2014 | Seok | |
| 2014/0169357 A1 | 6/2014 | Noh et al. | |
| 2016/0088637 A1 | 3/2016 | Suh et al. | |
| 2016/0119902 A1 | 4/2016 | Cheong et al. | |
| 2017/0093600 A1* | 3/2017 | Li | H04L 5/0037 |
| 2017/0273112 A1* | 9/2017 | Lou | H04W 72/121 |
| 2017/0331605 A1* | 11/2017 | Shani | H04L 25/0206 |
| 2019/0222270 A1* | 7/2019 | Schelstraete | H04B 7/0417 |

FOREIGN PATENT DOCUMENTS

| | | |
|---|---|---|
| CN | 104662987 A | 5/2015 |
| CN | 104704870 A | 6/2015 |
| CN | 104853385 A | 8/2015 |
| CN | 104902571 A | 9/2015 |
| CN | 105451346 A | 3/2016 |

OTHER PUBLICATIONS

IEEE P802.11ax/D0.1 Draft Standard for Information Technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for high efficiency in frequency bands between 1 GHz and 6 GHz, IEEE Computer Society, Mar. 2016, 221 pages.

* cited by examiner

An AP sends a channel measurement notification message, where the channel measurement notification message includes a STA indication and a to-be-measured channel indication, the STA indication is used to indicate M STAs designated by the AP to participate in channel measurement, and the to-be-measured channel indication is used to indicate V to-be-measured sub-channels, where both M and V are positive integers, M≥2, and V≥1 — 601

The STA sends a channel sounding signal to the AP, where the STA is included in any one of W groups into which the M STAs that need to measure a channel are divided, each group includes N STAs, N STAs in a same group simultaneously send channel sounding signals on a same sub-channel in the V to-be-measured sub-channels, the channel sounding signal includes a plurality of subcarriers, every Ng consecutive subcarriers are a group of subcarriers, each of the N STAs in each group occupies a subcarrier at a fixed location in each group of subcarriers, and subcarriers that are occupied by the N STAs in the same group and that are in a same group of subcarriers are different from each other, where W, N, and Ng are all positive integers, N≥2, W≥1, Ng≥N, and a value of Ng is included in the channel measurement notification message or is determined based on M and V — 602

FIG. 6

An AP sends a channel measurement notification message, where the channel measurement notification message includes a STA indication and a to-be-measured channel indication, the STA indication is used to indicate M STAs designated by the AP to participate in channel measurement, and the to-be-measured channel indication is used to indicate V to-be-measured sub-channels, where V=1 — 701

The M STAs determine, based on the STA indication and Ng, locations occupied by the STAs in each group of subcarriers — 702

The M STAs simultaneously send channel sounding signals on the to-be-measured sub-channel — 703

FIG. 7

An AP sends a channel measurement notification message, where the channel measurement notification message includes a STA indication, a to-be-measured channel indication, and a STA quantity indication of each group in W groups or a group quantity indication, the STA indication is used to indicate M STAs designated by the AP to participate in channel measurement, the to-be-measured channel indication is used to indicate V to-be-measured sub-channels, the STA quantity indication of each group is used to indicate a quantity N of STAs in each group when the M STAs that need to measure a channel are divided into the W groups, and the group quantity indication is used to indicate a quantity W of groups when the STAs that need to measure the channel are divided into the groups, where M, V, W, and N are all positive integers, $M \geq 2$, $V=1$, $W \geq 2$, and $N \geq 2$ — 1001

The STA obtains a group to which the STA belongs and a location occupied by the STA in each group of subcarriers — 1002

The STA obtains, based on the group to which the STA belongs, a symbol quantity of a channel sounding signal, a symbol length of the channel sounding signal, an interframe space between the channel measurement notification message and the channel sounding signal, and an interframe space between channel sounding signals, a sending moment at which the STA sends the channel sounding signal at the occupied location in each group of subcarriers — 1003

The STA sends the channel sounding signal to the AP — 1004

FIG. 10

| Channel measurement notification message | Channel sounding message | Channel sounding message | Channel sounding message |
|---|---|---|---|
| AP | STA 1 & STA 2 | STA 3 & STA 4 | STA 5 & STA 6 |

FIG. 11

An AP sends a channel measurement notification message, where the channel measurement notification message includes a STA indication, a to-be-measured channel indication, and a STA quantity indication of each group in W groups or a group quantity indication, the STA indication is used to indicate M STAs designated by the AP to participate in channel measurement, the to-be-measured channel indication is used to indicate V to-be-measured sub-channels, the STA quantity indication of each group is used to indicate a quantity N of STAs in each group when the M STAs that need to measure a channel are divided into the W groups, and the group quantity indication is used to indicate a quantity W of groups when the STAs that need to measure the channel are divided into the groups, where M, V, W, and N are all positive integers, $M \geq 2$, $V \geq 2$, $W \geq 2$, and $N \geq 1$    1201

The M STAs obtain groups to which the STAs belong and locations occupied by the STAs in each group of subcarriers    1202

Each STA in the M STAs sends a channel sounding signal to the AP on any sub-channel at a location occupied by the STA in each group of subcarriers, where in a same timeslot, a group to which the STA belongs simultaneously sends channel sounding signals on a same sub-channel, and the W groups simultaneously send channel sounding signals on different sub-channels; and in different timeslots, a same group is located on different sub-channels, and $W \geq S \geq 1$    1203

CHANNEL MEASUREMENT METHOD AND APPARATUS

CROSS-REFERENCE TO RELATED APPLICATIONS

This application is a national stage of International Application No. PCT/CN2016/097750, filed on Aug. 31, 2016, which is hereby incorporated by reference in its entirety.

TECHNICAL FIELD

The present invention relates to the communications field, and in particular, to a channel measurement method and apparatus.

BACKGROUND

Long-distance transmission is mainly used in a scenario such as a sensor network or industrial control. An expected transmission radius of long-distance transmission may reach 2 km or longer. A method for implementing long-distance transmission is narrowband transmission. To be specific, energy is concentrated on narrower bandwidth, to implement longer-distance transmission.

Minimum transmission bandwidth of conventional Wireless Fidelity (WiFi) is 20 MHz. To extend a transmission range, transmission bandwidth may be reduced, for example, transmission is performed on bandwidth of 2 MHz. To improve transmission efficiency and enable WiFi to better work in a scenario in which devices are highly densely distributed, in 802.11ax, orthogonal frequency division multiple access (OFDMA) and uplink multi-user multiple-input multiple-output (UL MU-MIMO) are introduced. OFDMA includes UL OFDMA and downlink orthogonal frequency division multiple access (Downlink OFDMA, DL OFDMA). UL OFDMA and UL MU-MIMO may be collectively referred to as UL MU transmission, and DL OFDMA and DL MU-MIMO (introduced in the 802.11ac standard) may be collectively referred to as DL MU transmission. In long-distance narrowband transmission, the DL MU transmission is usually difficult to implement because of a limitation of maximum transmit power of an access point (Access Point, AP). When the AP performs the DL MU transmission, power obtained by each user is less than that in single user (SU) transmission, and therefore, a purpose of long-distance transmission cannot be achieved. In other words, a DL signal may be incapable of reaching a station (STA). However, the UL MU transmission is still feasible. Energy of the UL MU transmission is jointly provided by a plurality of users, and transmit power of each user is limited only by a capability of the user and maximum transmit power that is of a device and that is required in a country and a region. Therefore, the UL MU transmission does not affect receive power that is of a transmit signal of each user and that is at the AP. In long-distance narrowband UL MU transmission, because a sub-channel occupied by each user is relatively narrow, channel frequency selectivity is apparent. In other words, channel characteristics of different sub-channels vary greatly. In this case, a UL channel needs to be measured, to allocate an appropriate sub-channel to each STA and determine an appropriate modulation and coding scheme (MCS), so that the UL MU transmission is efficiently performed.

A UL channel measurement method in the prior art is shown in FIG. 1. An access point (AP) sends a TF-S (Trigger for Sounding) frame to indicate a list of STAs that need to perform a measurement process and a set of sub-channels that need to be measured. In addition, each STA simultaneously sends channel sounding messages only on sub-channels that are considered to be idle by the STA and that are in the set of sub-channels indicated by the AP, so that the AP measures a UL channel. However, in a long-distance transmission case, each STA simultaneously sends the sounding messages on a plurality of sub-channels that are considered to be idle by the STA, and therefore, energy is distributed on the plurality of sub-channels, and in this case, the sounding messages may be incapable of reaching the AP. In addition, when the STAs send the sounding messages to the AP, only one STA performs sending in each timeslot, and before obtaining a measurement result of the UL channel, the AP needs to sequentially receive the sounding messages sent by all the STAs in the list of STAs. Therefore, time overheads of a UL channel measurement execution process are relatively high.

SUMMARY

Embodiments of the present invention provide a channel measurement method and apparatus, to resolve a problem that an AP cannot receive, in a UL channel measurement process, a channel sounding message sent by a STA and a problem that time overheads of a UL channel measurement execution process are high.

According to one aspect, an embodiment of the present invention provides a channel measurement method, including: sending, by an access point AP, a channel measurement notification message, where the channel measurement notification message includes a station STA indication and a to-be-measured channel indication, the STA indication is used to indicate M STAs designated by the AP to participate in channel measurement, and the to-be-measured channel indication is used to indicate V to-be-measured sub-channels; and receiving, by the AP, channel sounding signals sent by the M STAs, where the M STAs that need to measure a channel are divided into W groups, each group includes N STAs, N STAs in a same group simultaneously send channel sounding signals on a same sub-channel in the V to-be-measured sub-channels, the channel sounding signal includes a plurality of subcarriers, every Ng consecutive subcarriers are a group of subcarriers, each of the N STAs in each group occupies a subcarrier at a fixed location in each group of subcarriers, and subcarriers that are occupied by the N STAs in the same group and that are in a same group of subcarriers are different from each other, where M, W, V, N, and Ng are all positive integers, M≥N—2, W≥1, V≥1, Ng≥N, and a value of Ng is included in the channel measurement notification message or is determined based on M and V. Each of the N STAs in each group occupies the subcarrier at the fixed location in each group of subcarriers, and the N STAs in the same group occupy different subcarriers in each group of subcarriers. In this way, in the present invention, a group of STAs simultaneously send channel sounding signals on one sub-channel, and therefore, energy does not disperse on a plurality of channels, and the AP can receive a channel sounding message sent by the STA. Unlike the prior art in which STAs sequentially send channel sounding signals, the same group of STAs can simultaneously send the channel measurement sounding signals on the same channel. In other words, the present invention can be used to resolve a problem that the AP cannot receive, in a UL channel measurement process, a channel sounding signal sent by the STA and a problem that time overheads of a UL channel measurement execution process are high.

In a possible design, the channel measurement notification message further includes a STA quantity indication of each group in the W groups or a group quantity indication, the STA quantity indication of each group is used to indicate a quantity N of STAs in each group when the M STAs that need to measure the channel are divided into the W groups, and the group quantity indication is used to indicate a quantity W of groups after the M STAs that need to measure the channel are divided into the groups. The STAs are divided into the groups, and therefore, the plurality of groups of STAs can send channel sounding signals on a plurality of sub-channels in a same timeslot, and each group of STAs in the plurality of groups of STAs can simultaneously send channel sounding signals, thereby saving a time resource. The STA quantity indication of each group and Ng may be a same indication.

In a possible design, the receiving, by the AP, channel sounding signals sent by the M STAs that need to measure a channel includes: receiving, by the AP, the channel sounding signals sent by the W groups on a same sub-channel in different timeslots, where each timeslot is corresponding to one group, and a quantity of timeslots is W. Because the quantity Ng of subcarriers in each group of subcarriers has an upper limit, if the quantity Ng of subcarriers in each group of subcarriers exceeds the upper limit, it indicates that an interval between subcarriers occupied by each STA on the channel is excessively large, and as a result, a measurement result may be less accurate. Therefore, if there are a relatively large quantity of stations STAs that are instructed by the AP to participate in channel measurement, these stations STAs may be divided into groups, and each group occupies one timeslot, so that an interval between subcarriers occupied by the STA on the channel is relatively small and a measurement result is relatively accurate.

In a possible design, when $V \geq 2$ and M=N, the receiving, by the AP, channel sounding signals sent by the M STAs includes: receiving, by the AP, the channel sounding signals simultaneously sent by the M STAs on the V sub-channels. In other words, the M STAs are considered as one group, and simultaneously send channel sounding signals on the V sub-channels, thereby reducing time consumed for sending.

In a possible design, when $W \geq 2$ and W=V, the receiving, by the AP, channel sounding signals sent by the M STAs that need to measure a channel includes: receiving, by the AP, the channel sounding signals sent by the W groups in S timeslots, where the W groups simultaneously send the channel sounding signals in a same timeslot by occupying different sub-channels, a same group occupies different sub-channels in different timeslots, and $W \geq S1$. In the prior art, a plurality of groups of STAs spend a relatively large amount of time in measuring a plurality of channels, because in the prior art, only one STA can send a channel sounding signal in one timeslot. However, in this embodiment of the present invention, a plurality of groups of STAs send channel sounding signals in one timeslot, thereby greatly reducing time consumed for sending. In addition, in this embodiment of the present invention, each group of STAs in the plurality of groups of STAs occupy one sub-channel in a same timeslot, so that energy of each STA in each group of STAs does not disperse. However, in the prior art, one STA may send channel sounding signals on a plurality of idle sub-channels in one timeslot, and consequently, energy used by the STA to send the channel sounding signal may disperse, the channel sounding signal may be incapable of reaching the AP, and the AP cannot obtain a channel measurement result.

In a possible design, the channel measurement notification message further includes a quantity S of timeslots. In some cases, only a channel resource available for the STA needs to be found, and no traversal measurement needs to be performed on the channels. Therefore, S is less than or equal to V. The quantity S of timeslots required for measurement may be determined based on historical experience, and a required channel status is obtained by occupying a relatively small quantity of timeslots, thereby further reducing channel measurement time.

In a possible design, the channel measurement notification message further includes a channel power control indication, and the channel power control indication is used to indicate power at which each STA in each group sends the channel sounding signal, or indicate expected signal strength of the channel sounding signal sent by each STA in each group when the channel sounding signal reaches the AP. The expected signal strength is received signal strength of a signal when the AP receives the signal, the signal is sent by the STA, and the received signal strength of the signal is expected by the AP. In this way, channel sounding signals simultaneously sent by a same group of STAs have similar signal strength when reaching the AP, so that the AP receives the channel sounding signals.

In a possible design, the channel measurement notification message further includes a symbol quantity indication of the channel sounding signal, and the symbol quantity indication is used to indicate a quantity of symbols included in each channel sounding signal sent by each of the M STAs that need to measure the channel. A symbol quantity of the channel sounding signal is used to indicate a total quantity of symbols included in the channel sounding signal, and the quantity of symbols is related to a quantity of antennas of the STA. Because the STA does not know the quantity of antennas of the STA, the STA needs the indication from the AP, to calculate a channel status of each antenna of the STA by using the quantity of symbols included in the channel sounding signal.

In a possible design, the channel measurement notification message further includes a symbol length indication of the channel sounding signal, and the symbol length indication is used to indicate a time domain length of each symbol included in each channel sounding signal sent by each of the M STAs that need to measure the channel. The STA may determine, based on the symbol length indication, a specific symbol length of a channel sounding signal that the STA specifically sends, to obtain a sending moment at which the STA sends the channel sounding signal.

In a possible design, the channel measurement notification message further includes a carrier sense indication, and the carrier sense indication is used to indicate whether each of the M STAs that need to measure the channel determines, based on a channel sense result, whether to send the channel sounding signal. The channel is in either of two statuses: an idle state and a non-idle state. Therefore, the carrier sense indication is set to indicate that whether to send the channel sounding signal is determined based on the channel sense result, so that the STA may send no channel sounding signal when the channel is not idle. Because there is interference in a channel sounding signal that is sent when the channel is not idle, even if the channel sounding signal is sent, it is possible that the channel sounding signal cannot be used for channel measurement. However, this case can be avoided by using the carrier sense indication.

In a possible design, the symbol included in the channel sounding signal is an orthogonal frequency division multiplexing OFDM symbol.

In a possible design, the channel measurement notification message further includes a measurement type indication, and the measurement type indication is used to distinguish between a channel measurement notification message in the prior art and the channel measurement notification message in this embodiment of the present invention. Because there are many precedent channel measurement methods, the channel measurement notification message in the present invention should carry an indication, so that the STA can distinguish between the channel measurement notification message in this solution and the channel measurement notification message in the prior art. The measurement type indication may be a frame type indication; or an existing frame format of the channel measurement notification message may be reused, but another field in a MAC header is used to instruct to use the measurement method in this solution.

According to another aspect, an embodiment of the present invention provides a channel measurement method, including: receiving, by a station STA, a channel measurement notification message sent by an access point AP, where the channel measurement notification message includes a STA indication and a to-be-measured channel indication, the STA indication is used to indicate M STAs designated by the AP to participate in channel measurement, and the to-be-measured channel indication is used to indicate V to-be-measured sub-channels; and sending, by the STA, a channel sounding signal to the AP, where the STA is included in any one of W groups into which the M STAs that need to measure a channel are divided, each group includes N STAs, N STAs in a same group simultaneously send channel sounding signals on a same sub-channel in the V to-be-measured sub-channels, the channel sounding signal includes a plurality of subcarriers, every Ng consecutive subcarriers are a group of subcarriers, each of the N STAs in each group occupies a subcarrier at a fixed location in each group of subcarriers, and the N STAs in the same group occupy different subcarriers in a same group of subcarriers, where M, W, V, N, and Ng are all positive integers, M≥N≥2, W≥1, V≥1, Ng≥N, and a value of Ng is included in the channel measurement notification message or is determined based on M and V. In the present invention, a group of STAs simultaneously send channel sounding signals on one sub-channel, so that energy does not disperse on a plurality of channels, and therefore, the AP can receive the channel sounding message sent by the STA. In the present invention, a subcarrier on one channel is occupied by a group of STAs, but in the prior art, a subcarrier on one channel can be occupied by only one STA. Therefore, in one timeslot, in the present invention, channel statuses of a group of STAs can be measured, but in the prior art, a channel status of only one STA can be measured. Therefore, in the present invention, time is saved. Therefore, the present invention can be used to resolve a problem that the AP cannot receive, in a UL channel measurement process, a channel sounding signal sent by the STA and a problem that time overheads of a UL channel measurement execution process are high.

In a possible design, the channel measurement notification message further includes a STA quantity indication of each group in the W groups or a group quantity indication, the STA quantity indication of each group is used to indicate a quantity N of STAs in each group when the M STAs that need to measure the channel are divided into the W groups, and the group quantity indication is used to indicate a quantity W of groups after the M STAs that need to measure the channel are divided into the groups.

In a possible design, the sending, by the STA, a channel sounding signal to the AP includes: determining, by the STA based on the STA indication and Ng, a location occupied by the STA in each group of subcarriers.

In a possible design, when V=1, before the sending, by the STA, a channel sounding signal to the AP, the method further includes: obtaining, by the STA based on the STA indication, a quantity of groups of the M STAs, and an identifier of the STA, a group to which the STA belongs and a location occupied by the STA in each group of subcarriers; or obtaining, by the STA based on the indication of a STA that is to perform measurement, the quantity of STAs in each group after the M STAs that are to perform measurement are divided into the groups, and an identifier that is of the STA and that is in the indication of the STA that is to perform measurement, a group to which the STA belongs and a location occupied by the STA in each group of subcarriers; or obtaining, by the STA based on the STA indication, Ng, and an identifier of the STA, a group to which the STA belongs and a location occupied by the STA in each group of subcarriers.

In a possible design, when V=1, before the sending, by the STA, a channel sounding signal to the AP, the method further includes: obtaining, by the STA based on the group to which the STA belongs, a symbol quantity of the channel sounding signal, a symbol length of the channel sounding signal, an interframe space between the channel measurement notification message and the channel sounding signal, and an interframe space between the channel sounding signals, a sending moment at which the STA sends the channel sounding signal at the occupied location in each group of subcarriers.

In a possible design, when W≥2 and W=V, the STA is corresponding to S sending timeslots, in other words, the AP allocates the S sending timeslots to the STA, and the sending, by the STA, a channel sounding signal to the AP includes: sending, by the STA, the channel sounding signal to the AP on any sub-channel at the location occupied by the STA in each group of subcarriers, where the STA is located on different sub-channels in the S different sending timeslots, where in a same timeslot, the group to which the STA belongs simultaneously sends channel sounding signals on a same sub-channel, and the W groups simultaneously send channel sounding signals on different sub-channels; and in different timeslots, a same group is located on different sub-channels, and W≥S≥1. Herein, "is located on" may be understood as "occupies", "takes up", or the like, and that the STA is located on different sub-channels may be understood as that channel sounding signals sent by the STA occupy or take up different sub-channels. In this embodiment of the present invention, a plurality of groups of STAs send channel sounding signals in one timeslot, and this greatly reduces channel measurement time. In addition, in this embodiment of the present invention, when the plurality of groups of STAs simultaneously perform sending, strength of the channel sounding signals is not affected. However, in the prior art, energy of a channel sounding signal sent by one STA each time disperses, and the channel sounding signal may be incapable of reaching the AP. Consequently, no channel measurement result can be obtained, and the channel sounding signal may further need to be sent again, thereby wasting a resource and time.

In a possible design, the channel measurement notification message further includes a timeslot quantity indication, and the timeslot quantity indication is used to indicate that the STA is corresponding to the S sending timeslots.

In a possible design, the channel measurement notification message further includes a carrier sense indication, and the carrier sense indication is used to indicate whether each of the M STAs determines, based on a channel sense result, whether to send the channel sounding signal; and if the carrier sense indication is used to indicate that each of the M STAs determines, based on the channel sense result, whether to send the channel sounding signal, before the receiving, by a STA, a channel measurement notification message, or before the sending, by the STA, a channel sounding signal to the AP, the method further includes: sensing, by the STA, whether the to-be-measured sub-channel is idle; and if the STA senses that any sub-channel in the V to-be-measured sub-channels is idle, determining, by the STA, to send the channel sounding signal to the AP on the any sub-channel; or if the STA senses that any sub-channel in the V to-be-measured sub-channels is not idle, determining, by the STA, not to send the channel sounding signal to the AP on the any sub-channel.

In a possible design, the channel measurement notification message further includes a symbol quantity indication and a symbol length indication of the channel sounding signal, the symbol quantity indication is used to indicate a quantity of symbols included in the channel sounding signal sent by each of the M STAs, and the symbol length indication is used to indicate a time domain length of each symbol included in the channel sounding signal sent by each of the M STAs.

In a possible design, the channel measurement notification message further includes a channel power control indication, and the channel power control indication is used to indicate power at which each STA in each group sends the channel sounding signal, or indicate expected signal strength of the channel sounding signal sent by each STA in each group when the channel sounding signal reaches the AP.

In a possible design, the symbol included in the channel sounding signal is an orthogonal frequency division multiplexing OFDM symbol.

In a possible design, the channel measurement notification message further includes a measurement type indication, and the measurement type indication is used to indicate the channel measurement notification message in this solution. Because there are many precedent measurement methods, the channel measurement notification message should carry an indication, so that the STA can distinguish between the channel measurement notification message in this solution and a channel measurement notification message in the prior art.

According to still another aspect, an embodiment of the present invention provides an access point AP, including: a sending unit, configured to send a channel measurement notification message, where the channel measurement notification message includes a station STA indication and a to-be-measured channel indication, the STA indication is used to indicate M STAs designated by the AP to participate in channel measurement, and the to-be-measured channel indication is used to indicate V to-be-measured sub-channels; and a receiving unit, configured to receive channel sounding signals sent by the M STAs, where the M STAs that need to measure a channel are divided into W groups, each group includes N STAs, N STAs in a same group simultaneously send channel sounding signals on a same sub-channel in the V to-be-measured sub-channels, the channel sounding signal includes a plurality of subcarriers, every Ng consecutive subcarriers are a group of subcarriers, each of the N STAs in each group occupies a subcarrier at a fixed location in a same group of subcarriers, and subcarriers that are occupied by the N STAs in the same group and that are in each group of subcarriers are different from each other, where M, W, V, N, and Ng are all positive integers, $M \geq N \geq 2$, $W \geq 1$, $V \geq 1$, $Ng \geq N$, and a value of Ng is included in the channel measurement notification message or is determined based on M and V.

In a possible design, the channel measurement notification message further includes a STA quantity indication of each group in the W groups or a group quantity indication, the STA quantity indication of each group is used to indicate a quantity N of STAs in each group when the M STAs that need to measure the channel are divided into the W groups, and the group quantity indication is used to indicate a quantity W of groups after the M STAs that need to measure the channel are divided into the groups.

In a possible design, the receiving unit is configured to: receive the channel sounding signals sent by the W groups on a same sub-channel in different timeslots, where each timeslot is corresponding to one group, and a quantity of timeslots is W.

In a possible design, when $W \geq 2$ and $W=V$, the receiving unit is configured to: receive the channel sounding signals sent by the W groups in S timeslots, where the W groups simultaneously send the channel sounding signals in a same timeslot by occupying different sub-channels, a same group occupies different sub-channels in different timeslots, and $W \geq S \geq 1$.

In a possible design, the sending unit is configured to: send the channel measurement notification message, where the channel measurement notification message further includes the quantity S of timeslots.

In a possible design, the channel measurement notification message further includes a channel power control indication, and the channel power control indication is used to indicate power at which each STA in each group sends the channel sounding signal, or indicate expected signal strength of the channel sounding signal sent by each STA in each group when the channel sounding signal reaches the AP. In this way, channel sounding signals simultaneously sent by a same group of STAs have similar signal strength when reaching the AP, so that the AP receives the channel sounding signals.

In a possible design, the channel measurement notification message further includes a symbol quantity indication of the channel sounding signal, and the symbol quantity indication is used to indicate a quantity of symbols included in each channel sounding signal sent by each of the M STAs that need to measure the channel.

In a possible design, the channel measurement notification message further includes a symbol length indication of the channel sounding signal, and the symbol length indication is used to indicate a time domain length of each symbol included in each channel sounding signal sent by each of the M STAs that need to measure the channel.

In a possible design, the channel measurement notification message further includes a carrier sense indication, and the carrier sense indication is used to indicate whether each of the M STAs that need to measure the channel determines, based on a channel sense result, whether to send the channel sounding signal.

In a possible design, the symbol included in the channel sounding signal is an orthogonal frequency division multiplexing OFDM symbol.

In a possible design, the channel measurement notification message further includes a measurement type indication, and the measurement type indication is used for the channel measurement notification message in this embodiment of the present invention. Because there are many precedent measurement methods, the channel measurement notification message should carry an indication, so that the STA can distinguish between the channel measurement notification message in this solution and a channel measurement notification message in the prior art. The measurement type indication may be a frame type indication; or an existing frame format of the channel measurement notification message may be reused, but another field in a MAC header is used to instruct to use the measurement method in this solution.

According to still another aspect, a station STA is provided, including: a receiving unit, configured to receive a channel measurement notification message sent by an AP, where the channel measurement notification message includes a STA indication and a to-be-measured channel indication, the STA indication is used to indicate M STAs designated by the AP to participate in channel measurement, and the to-be-measured channel indication is used to indicate V to-be-measured sub-channels; and a sending unit, configured to send a channel sounding signal, where the STA is included in any one of W groups into which the M STAs that need to measure a channel are divided, each group includes N STAs, N STAs in a same group simultaneously send channel sounding signals on a same sub-channel in the V to-be-measured sub-channels, the channel sounding signal includes a plurality of subcarriers, every Ng consecutive subcarriers are a group of subcarriers, each of the N STAs in each group occupies a subcarrier at a fixed location in each group of subcarriers, and the N STAs in the same group occupy different subcarriers in a same group of subcarriers, where M, W, V, N, and Ng are all positive integers, M≥N≥2, W≥1, V≥1, Ng≥N, and a value of Ng is included in the channel measurement notification message or is determined based on M and V.

In a possible design, the channel measurement notification message further includes a STA quantity indication of each group in the W groups or a group quantity indication, the STA quantity indication of each group is used to indicate a quantity N of STAs in each group when the M STAs that need to measure the channel are divided into the W groups, and the group quantity indication is used to indicate a quantity W of groups after the M STAs that need to measure the channel are divided into the groups.

In a possible design, that the STA sends the channel sounding signal to the AP includes: determining, by the STA based on the STA indication and Ng, a location occupied by the STA in each group of subcarriers.

In a possible design, when V=1, the STA further includes a processing unit, and the processing unit is configured to: obtain, based on the STA indication, a quantity of groups of the M STAs, and an identifier of the STA, a group to which the STA belongs and a location occupied by the STA in each group of subcarriers; or obtain, based on the indication of a STA that is to perform measurement, the quantity of STAs in each group after the M STAs that are to perform measurement are divided into the groups, and an identifier that is of the STA and that is in the indication of the STA that is to perform measurement, a group to which the STA belongs and a location occupied by the STA in each group of subcarriers; or obtain, based on the STA indication, Ng, and an identifier of the STA, a group to which the STA belongs and a location occupied by the STA in each group of subcarriers.

In a possible design, when V=1, the processing unit is further configured to: obtain, based on the group to which the STA belongs, a symbol quantity of the channel sounding signal, a symbol length of the channel sounding signal, an interframe space between the channel measurement notification message and the channel sounding signal, and an interframe space between the channel sounding signals, a sending moment at which the STA sends the channel sounding signal at the occupied location in each group of subcarriers.

In a possible design, when W≥2 and W=V, the STA is corresponding to S sending timeslots, and the sending unit is configured to: send the channel sounding signal, where the STA is located on different sub-channels in the S different sending timeslots; and send the channel sounding signal to the AP on any sub-channel at the location occupied by the STA in each group of subcarriers, where in a same timeslot, the group to which the STA belongs simultaneously sends channel sounding signals on a same sub-channel, and the W groups simultaneously send channel sounding signals on different sub-channels; and in different timeslots, a same group is located on different sub-channels, and W≥S≥1.

In a possible design, the channel measurement notification message further includes a timeslot quantity indication, and the timeslot quantity indication is used to indicate that the STA is corresponding to the S sending timeslots.

In a possible design, the channel measurement notification message further includes a carrier sense indication, and the carrier sense indication is used to indicate whether each of the M STAs determines, based on a channel sense result, whether to send the channel sounding signal; and the STA further includes a sense unit, and if the carrier sense indication is used to indicate that each of the M STAs determines, based on the channel sense result, whether to send the channel sounding signal, before the STA receives the channel measurement notification message, the sense unit is configured to: sense whether the to-be-measured sub-channel is idle; and if the STA senses that any sub-channel in the V to-be-measured sub-channels is idle, determine to send the channel sounding signal to the AP on the any sub-channel; or if the STA senses that any sub-channel in the V to-be-measured sub-channels is not idle, determine not to send the channel sounding signal to the AP on the any sub-channel.

In a possible design, the channel measurement notification message further includes a symbol quantity indication and a symbol length indication of the channel sounding signal, the symbol quantity indication is used to indicate a quantity of symbols included in the channel sounding signal sent by each of the M STAs, and the symbol length indication is used to indicate a time domain length of each symbol included in the channel sounding signal sent by each of the M STAs.

In a possible design, the channel measurement notification message further includes a channel power control indication, and the channel power control indication is used to indicate power at which each STA in each group sends the channel sounding signal, or indicate expected signal strength of the channel sounding signal sent by each STA in each group when the channel sounding signal reaches the AP.

In a possible design, the symbol included in the channel sounding signal is an orthogonal frequency division multiplexing OFDM symbol.

In a possible design, the channel measurement notification message further includes a measurement type indication, and the measurement type indication is used for the channel measurement notification message in this embodiment of the present invention. Because there are many precedent measurement methods, the channel measurement notification message should carry an indication, so that the STA can distinguish between the channel measurement notification message in this solution and a channel measurement notification message in the prior art. The measurement type indication may be a frame type indication; or an existing frame format of the channel measurement notification message may be reused, but another field in a MAC header is used to instruct to use the measurement method in this solution.

According to still another aspect, an embodiment of the present invention provides an access point AP, including: a transmitter, configured to send a channel measurement notification message, where the channel measurement notification message includes a station STA indication and a to-be-measured channel indication, the STA indication is used to indicate M STAs designated by the AP to participate in channel measurement, and the to-be-measured channel indication is used to indicate V to-be-measured sub-channels; and a receiver, configured to receive channel sounding signals sent by the M STAs, where the M STAs that need to measure a channel are divided into W groups, each group includes N STAs, N STAs in a same group simultaneously send channel sounding signals on a same sub-channel in the V to-be-measured sub-channels, the channel sounding signal includes a plurality of subcarriers, every Ng consecutive subcarriers are a group of subcarriers, each of the N STAs in each group occupies a subcarrier at a fixed location in each group of subcarriers, and subcarriers that are occupied by the N STAs in the same group and that are in a same group of subcarriers are different from each other, where M, W, V, N, and Ng are all positive integers, M≥N≥2, W≥1, V≥1, Ng≥N, and a value of Ng is included in the channel measurement notification message or is determined based on M and V.

In a possible design, the channel measurement notification message further includes a STA quantity indication of each group in the W groups or a group quantity indication, the STA quantity indication of each group is used to indicate a quantity N of STAs in each group when the M STAs that need to measure the channel are divided into the W groups, and the group quantity indication is used to indicate a quantity W of groups after the M STAs that need to measure the channel are divided into the groups.

In a possible design, when V=1, the receiver is configured to receive the channel sounding signals sent by the W groups on a same sub-channel in different timeslots, where each timeslot is corresponding to one group, and a quantity of timeslots is W.

In a possible design, when W≥2 and W=V, the receiver is configured to: receive the channel sounding signals sent by the W groups in S timeslots, where the W groups simultaneously send the channel sounding signals in a same timeslot by occupying different sub-channels, a same group occupies different sub-channels in different timeslots, and W≥S≥1.

In a possible design, the channel measurement notification message further includes the quantity S of timeslots.

In a possible design, the channel measurement notification message further includes a channel power control indication, and the channel power control indication is used to indicate power at which each STA in each group sends the channel sounding signal, or indicate expected signal strength of the channel sounding signal sent by each STA in each group when the channel sounding signal reaches the AP.

In a possible design, the channel measurement notification message further includes a symbol quantity indication of the channel sounding signal, and the symbol quantity indication is used to indicate a quantity of symbols included in each channel sounding signal sent by each of the M STAs that need to measure the channel.

In a possible design, the channel measurement notification message further includes a symbol length indication of the channel sounding signal, and the symbol length indication is used to indicate a time domain length of each symbol included in each channel sounding signal sent by each of the M STAs that need to measure the channel.

In a possible design, the channel measurement notification message further includes a carrier sense indication, and the carrier sense indication is used to indicate whether each of the M STAs that need to measure the channel determines, based on a channel sense result, whether to send the channel sounding signal.

In a possible design, the symbol included in the channel sounding signal is an orthogonal frequency division multiplexing OFDM symbol.

In a possible design, the channel measurement notification message further includes a measurement type indication, and the measurement type indication is used for the channel measurement notification message in this embodiment of the present invention. Because there are many precedent measurement methods, the channel measurement notification message should carry an indication, so that the STA can distinguish between the channel measurement notification message in this solution and a channel measurement notification message in the prior art. The measurement type indication may be a frame type indication; or an existing frame format of the channel measurement notification message may be reused, but another field in a MAC header is used to instruct to use the measurement method in this solution.

According to still another aspect, a station STA is provided, including: a receiver, configured to receive a channel measurement notification message sent by an access point AP, where the channel measurement notification message includes a STA indication and a to-be-measured channel indication, the STA indication is used to indicate M STAs designated by the AP to participate in channel measurement, and the to-be-measured channel indication is used to indicate V to-be-measured sub-channels; and a transmitter, configured to send a channel sounding signal, where the STA is included in any one of W groups into which the M STAs that need to measure a channel are divided, each group includes N STAs, N STAs in a same group simultaneously send channel sounding signals on a same sub-channel in the V to-be-measured sub-channels, the channel sounding signal includes a plurality of subcarriers, every Ng consecutive subcarriers are a group of subcarriers, each of the N STAs in each group occupies a subcarrier at a fixed location in each group of subcarriers, and the N STAs in the same group occupy different subcarriers in a same group of subcarriers, where M, W, V, N, and Ng are all positive integers, M≥N≥2, W≥1, V≥1, Ng≥N, and a value of Ng is included in the channel measurement notification message or is determined based on M and V.

In a possible design, the channel measurement notification message further includes a STA quantity indication of each group in the W groups or a group quantity indication, the STA quantity indication of each group is used to indicate a quantity N of STAs in each group when the M STAs that need to measure the channel are divided into the W groups, and the group quantity indication is used to indicate a quantity W of groups after the M STAs that need to measure the channel are divided into the groups.

In a possible design, the transmitter is configured to determine, based on the STA indication and Ng, a location occupied by the STA in each group of subcarriers.

In a possible design, when V=1, the STA further includes a processor, and before the STA sends the channel sounding signal to the AP, the processor is configured to: obtain, based on the STA indication, a quantity of groups of the M STAs, and an identifier of the STA, a group to which the STA belongs and a location occupied by the STA in each group of subcarriers; or obtain, based on the indication of a STA that is to perform measurement, the quantity of STAs in each group after the M STAs that are to perform measurement are divided into the groups, and an identifier that is of the STA and that is in the indication of the STA that is to perform measurement, a group to which the STA belongs and a location occupied by the STA in each group of subcarriers; or obtain, based on the STA indication, Ng, and an identifier of the STA, a group to which the STA belongs and a location occupied by the STA in each group of subcarriers.

In a possible design, when V=1, the processing unit is further configured to: obtain, based on the group to which the STA belongs, a symbol quantity of the channel sounding signal, a symbol length of the channel sounding signal, an interframe space between the channel measurement notification message and the channel sounding signal, and an interframe space between the channel sounding signals, a sending moment at which the STA sends the channel sounding signal at the occupied location in each group of subcarriers.

In a possible design, when W≥2 and W=V, the STA is corresponding to S sending timeslots, and the transmitter is configured to: send the channel sounding signal, where the STA is located on different sub-channels in the S different sending timeslots; and send the channel sounding signal to the AP on any sub-channel at the location occupied by the STA in each group of subcarriers, where in a same timeslot, the group to which the STA belongs simultaneously sends channel sounding signals on a same sub-channel, and the W groups simultaneously send channel sounding signals on different sub-channels; and in different timeslots, a same group is located on different sub-channels, and W≥S≥1.

In a possible design, the channel measurement notification message further includes a timeslot quantity indication, and the timeslot quantity indication is used to indicate that the STA is corresponding to the S sending timeslots.

In a possible design, the channel measurement notification message further includes a carrier sense indication, and the carrier sense indication is used to indicate whether each of the M STAs determines, based on a channel sense result, whether to send the channel sounding signal; and if the carrier sense indication is used to indicate that each of the M STAs determines, based on the channel sense result, whether to send the channel sounding signal, before the STA receives the channel measurement notification message, or before the STA sends the channel sounding signal to the AP, the processor is configured to: sense whether the to-be-measured sub-channel is idle; and if the STA senses that any sub-channel in the V to-be-measured sub-channels is idle, determine to send the channel sounding signal to the AP on the any sub-channel; or if the STA senses that any sub-channel in the V to-be-measured sub-channels is not idle, determine not to send the channel sounding signal to the AP on the any sub-channel.

In a possible design, the channel measurement notification message further includes a symbol quantity indication and a symbol length indication of the channel sounding signal, the symbol quantity indication is used to indicate a quantity of symbols included in the channel sounding signal sent by each of the M STAs, and the symbol length indication is used to indicate a time domain length of each symbol included in the channel sounding signal sent by each of the M STAs.

In a possible design, the channel measurement notification message further includes a channel power control indication, and the channel power control indication is used to indicate power at which each STA in each group sends the channel sounding signal, or indicate expected signal strength of the channel sounding signal sent by each STA in each group when the channel sounding signal reaches the AP.

In a possible design, the symbol included in the channel sounding signal is an orthogonal frequency division multiplexing OFDM symbol.

In a possible design, the channel measurement notification message further includes a measurement type indication, and the measurement type indication is used for the channel measurement notification message in this embodiment of the present invention. Because there are many precedent measurement methods, the channel measurement notification message should carry an indication, so that the STA can distinguish between the channel measurement notification message in this solution and a channel measurement notification message in the prior art. The measurement type indication may be a frame type indication; or an existing frame format of the channel measurement notification message may be reused, but another field in a MAC header is used to instruct to use the measurement method in this solution.

According to yet another aspect, an embodiment of the present invention further provides a communications system, and the communications system includes an AP and at least two STAs. For a specific implementation of the AP and a specific implementation of the STA, refer to the foregoing description.

According to yet another aspect, an embodiment of the present invention provides a computer storage medium, configured to store a computer software instruction used by the foregoing AP, and the computer storage medium includes a program designed for executing the foregoing aspect.

According to yet another aspect, an embodiment of the present invention provides a computer storage medium, configured to store a computer software instruction used by the foregoing STA, and the computer storage medium includes a program designed for executing the foregoing aspect.

In this way, in the present invention, a group of STAs simultaneously send channel sounding signals on one sub-channel, and therefore, energy does not disperse on a plurality of channels, and the AP can receive a channel sounding message sent by the STA. Unlike the prior art in which STAs sequentially send channel sounding signals, the same group of STAs can simultaneously send the channel measurement sounding signals on the same channel. In other words, compared with that in the prior art, in the present invention, time overheads of a UL channel measurement execution process are reduced.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 6 is a schematic flowchart of a channel measurement method according to an embodiment of the present invention;

FIG. 7 is a schematic flowchart of a channel measurement method according to an embodiment of the present invention;

FIG. 10 is a schematic flowchart of a channel measurement method according to an embodiment of the present invention;

FIG. 11 is a schematic diagram of message interaction when a plurality of groups of STAs measure a sub-channel according to an embodiment of the present invention;

FIG. 12 is a schematic flowchart of a channel measurement method according to an embodiment of the present invention;

FIG. 14 is a schematic diagram of message sending when a plurality of groups of STAs measure a plurality of sub-channels in a plurality of timeslots according to an embodiment of the present invention;

FIG. 15 is a schematic diagram of message sending when a plurality of groups of STAs measure a plurality of sub-channels in a plurality of timeslots according to an embodiment of the present invention;

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention may be applied to a process of measuring a long-distance narrowband UL MU transmission channel in a wireless transmission technology, and may be applied to wideband channel measurement. This is not limited in this application.

Figure 1:
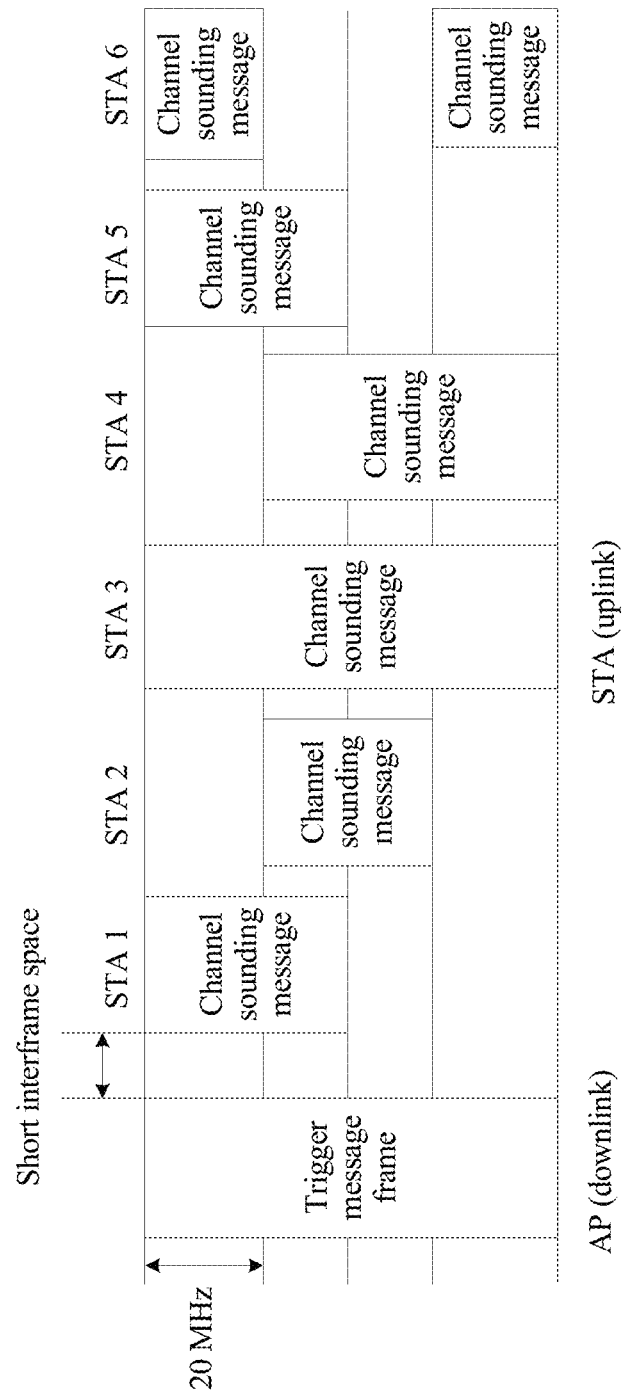
FIG. 1 is a schematic diagram of signal interaction in a channel measurement method according to an embodiment of the present invention.
Figure 2:
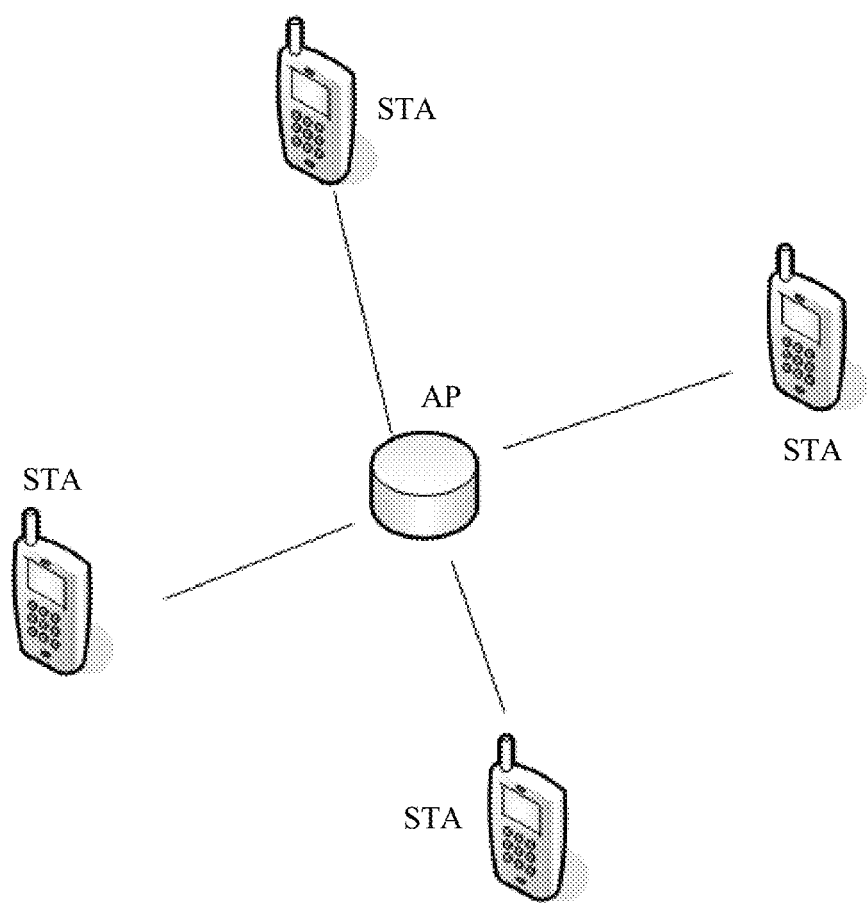
FIG. 2 is a diagram of a network architecture according to an embodiment of the present invention.

As shown in FIG. 2, a network architecture applied in the embodiments of the present invention may include an AP and a plurality of STAs in a coverage area of the AP. The AP is configured to: send a channel measurement notification message to schedule the STA to send a channel sounding signal, and further measure a channel based on the channel sounding signal sent by the STA. The AP may be a router, a mobile phone in a hotspot mode, or another device or apparatus that may be used for network communication. The STA may be configured to receive a message sent by the AP. For example, the STA may be a device or an apparatus such as a personal computer (PC), a mobile phone, a tablet computer (pad), a smart learning machine, a smart game console, a smart television, smart glasses, or a smartwatch.

Figure 3:
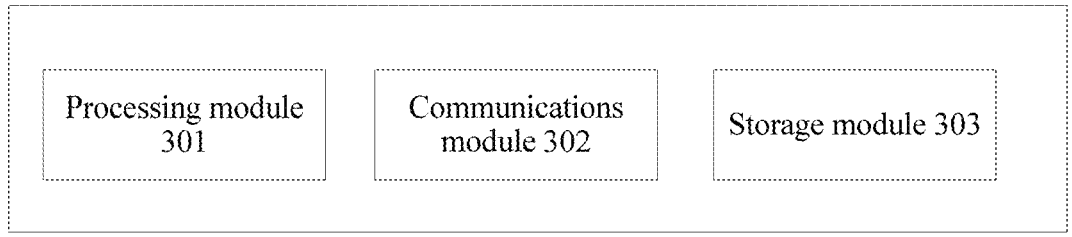
FIG. 3 is a schematic diagram of an internal structure of an AP according to an embodiment of the present invention.

FIG. 3 is a schematic diagram of an internal structure of an AP according to the present invention. In the present invention, the AP may include a processing module 301, a communications module 302, and a storage module 303. The processing module 301 is configured to control each hardware apparatus, application program software, and the like of the AP. The communications module 302 is configured to: receive, by using a communication manner such as WiFi, an instruction sent by another device, and send data of the AP to the another device. The storage module 303 is configured to perform software program storage, data storage, software running, and the like of the AP.

Figure 4:
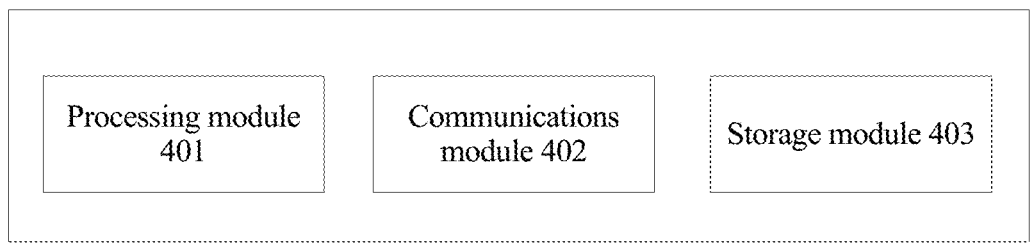
FIG. 4 is a schematic diagram of an internal structure of a STA according to an embodiment of the present invention.

FIG. 4 is a schematic diagram of an internal structure of a STA according to the present invention. In the present invention, the STA may include a processing module 401, a communications module 402, and a storage module 403.

The processing module 401 is configured to control each hardware apparatus, application program software, and the like of the STA. The communications module 402 is configured to: receive, by using a communication manner such as WiFi, an instruction sent by another device, and send data of the AP to the another device. The storage module 403 is configured to perform software program storage, data storage, software running, and the like of the STA.

Channel measurement of long-distance narrowband UL MU transmission in a WiFi technology is used as an example below to describe the embodiments of the present invention. A basic idea of the present invention is as follows: An AP sends a channel measurement notification message to schedule at least one group of STAs to send channel sounding messages, and each group of STAs include at least two STAs. A plurality of STAs in a same group simultaneously send channel sounding messages on a same sub-channel, and the channel sounding messages include channel sounding signals (Internet of Things Long Training Field, IoT-LTF). The AP measures a channel based on the channel sounding signals, and the channel sounding signals are multicarrier signals. Subcarriers occupied by the channel sounding signals in the channel sounding messages sent by different STAs in the same group alternately and cyclically appear in frequency domain. If more than one sub-channel needs to be sounded, each group of STAs send channel sounding messages on different sub-channels at different time.

Similar to a null data packet announcement (NDPA) in the 802.11ac standard, the channel measurement notification message is used to instruct a plurality of STAs to perform channel measurement. A sounding message in a null data packet (NDP) format, namely, NDP sounding, NDP for short, is usually used as the channel sounding message. The channel sounding signal is a long training field (LTF), and is used by a receive end to measure the channel. To differentiate an LTF used for channel measurement in the present invention from an LTF in a legacy format that may exist in the channel sounding message, the LTF used for channel measurement in the present invention is referred to as an Internet of Things long training field (IoT-LTF), or may be referred to as another name. The IoT-LTF includes at least one orthogonal frequency division multiplexing (OFDM) symbol, and each OFDM symbol includes a plurality of subcarriers.

Figure 5:
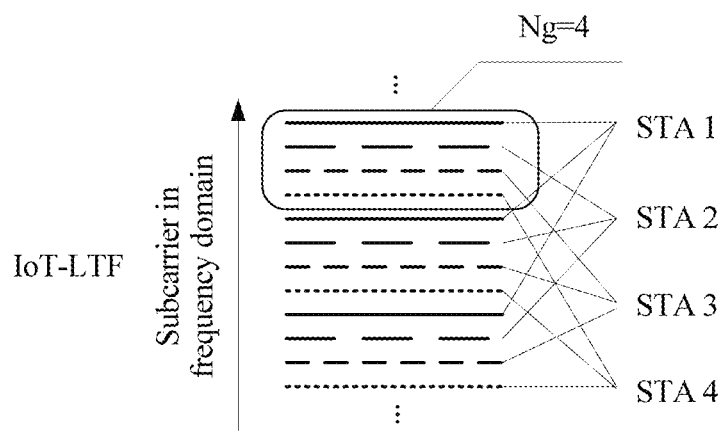
FIG. 5 is a schematic diagram of a subcarrier occupied by each STA in frequency domain in a channel measurement method according to an embodiment of the present invention.

A key of the present invention is as follows: In IoT-LTFs in channel sounding messages sent by a plurality of STAs on a same sub-channel, each STA occupies a different subcarrier, and subcarriers of different STAs appear alternately and cyclically. As shown in FIG. 5, for example, subcarriers occupied by a STA 1 are numbered 1, 5, 9, 13, . . . , a STA 2 occupies subcarriers numbered 2, 6, 10, 14, . . . , a STA 3 occupies subcarriers numbered 3, 7, 11, 15, . . . , and a STA 4 occupies subcarriers numbered 4, 8, 12, 16, . . . . For each STA, the AP measures IoT-LTFs sent by the STA on some subcarriers, and if the AP obtains receive power of the IoT-LTFs, the AP can estimate channel statuses of all subcarriers occupied by the STA. This is because channel statuses of adjacent subcarriers are roughly the same when a channel is relatively flat, and therefore, a channel measurement result of one subcarrier may be used as measurement results of several adjacent subcarriers without a need to measure the several adjacent subcarriers. Correspondingly, the STA needs to transmit no signal on these adjacent subcarriers. In other words, when sending IoT-LTFs, one STA transmits signals at an interval of several subcarriers, and other subcarriers are idle. Therefore, when one STA sends channel sounding signals IoT-LTFs at an interval of several subcarriers, in the present invention, another STA is arranged to transmit signals on these idle subcarriers. Compared with the prior art in which STAs sequentially send channel sounding signals to an AP, the present invention can reduce time consumed for channel measurement.

A person skilled in the art should know that not all subcarriers in an LTF are used for channel measurement. Usually, several subcarriers are kept idle in the middle of a channel to implement direct current protection, and some subcarriers that send no signal are also retained at both ends of a frequency band, to serve as guard bandwidth. Therefore, all subcarriers in the IoT-LTF mentioned in the present invention are subcarriers used for channel measurement other than these guard subcarriers. Correspondingly, a case of "Ng consecutive subcarriers" in the present invention is a case that appears after these guard subcarriers are ignored. For example, a subcarrier 32 is used as a guard subcarrier, and a subcarrier 31 and a subcarrier 33 are considered as consecutive subcarriers. It should be noted that the present invention may be applied to narrowband channel measurement, and may also be used for wideband channel measurement.

An embodiment of the present invention provides a channel measurement method. As shown in FIG. 6, the method includes the following steps.

601. An AP sends a channel measurement notification message, where the channel measurement notification message includes a STA indication and a to-be-measured channel indication, the STA indication is used to indicate M STAs designated by the AP to participate in channel measurement, and the to-be-measured channel indication is used to indicate V to-be-measured sub-channels, where both M and V are positive integers, M≥2, and V≥1.

The STA indication may be a list carrying a STA ID, and the list includes an identifier of the STA designated by the AP to participate in channel measurement. The STA can identify the identifier in the list to determine whether the STA needs to send a channel sounding signal. The STA indication may alternatively be a group identifier (Group Identifier, GID). To be specific, one identifier is used to represent a group of STAs. In this case, a correspondence between the group identifier and an identifier of the STA included in the group should be preset at an AP side and a STA side. The STA indication may alternatively be expressed by using a bitmap (bitmap) and a start STA ID. The start STA ID is an identifier that is corresponding to a first bit in the bitmap and that is corresponding to a STA. A STA corresponding to a bit of 1 in the bitmap is the STA designated by the AP to participate in channel measurement.

The to-be-measured channel indication may be a bandwidth indication. For example, the bandwidth indication indicates that bandwidth is 40 MHz, and to be specific, the bandwidth indication indicates a 40 MHz channel that includes a primary channel. Alternatively, a to-be-measured channel is indicated by using a channel number, or is expressed by jointly using bandwidth and a bitmap. For example, if the bandwidth is indicated to be 20 MHz and a fifth bit in a 10-bit bitmap is 1, it indicates that a fifth 2 MHz sub-channel in a 20 MHz channel is the to-be-measured channel.

602. The STA sends a channel sounding signal to the AP, where the STA is included in any one of W groups into which the M STAs that need to measure a channel are divided, each group includes N STAs, N STAs in a same group simultaneously send channel sounding signals on a same sub-channel in the V to-be-measured sub-channels, the channel sounding signal includes a plurality of subcarriers, every Ng consecutive subcarriers are a group of subcarriers, each of the N STAs in each group occupies a subcarrier at a fixed location in each group of subcarriers, and subcarriers that are occupied by the N STAs in the same group and that are in a same group of subcarriers are different from each other, where W, N, and Ng are all positive integers, N≥2, W≥1, Ng≥N, and a value of Ng is included in the channel measurement notification message or is determined based on M and V.

When the to-be-measured channel indicated by the AP is one sub-channel, in other words, V=1, if W=1, it indicates that the AP instructs all STAs in one group to measure the sub-channel. In this case, all the STAs simultaneously send channel sounding signals on the sub-channel, the channel sounding signal includes a plurality of subcarriers, every Ng consecutive subcarriers are a group of subcarriers, each STA occupies a subcarrier at a fixed location in each group of subcarriers, and subcarriers that are occupied by the STAs and that are in each group of subcarriers are different from each other.

When the to-be-measured channel indicated by the AP is one sub-channel, in other words, V=1, if W≥2, it indicates that the AP instructs STAs in at least two groups to measure the sub-channel. In this case, the groups of STAs send channel sounding signals on the sub-channel in different timeslots, STAs in a same group simultaneously send channel sounding signals in an occupied timeslot, each STA in each group of STAs occupies a subcarrier at a fixed location in each group of subcarriers, and STAs in each group of STAs occupy different subcarriers in each group of subcarriers.

When the to-be-measured channel indicated by the AP includes at least two sub-channels, in other words, V≥2, if W≥2, it indicates that the AP instructs STAs in at least two groups to measure the at least two sub-channels. In this case, in a same timeslot, STAs in different groups simultaneously send channel sounding signals on different sub-channels, and STAs in a same group simultaneously send channel sounding signals on different sub-channels in different sending timeslots. For a group of STAs on any sub-channel, each STA in each group of STAs occupies a subcarrier at a fixed location in each group of subcarriers, and STAs in each group of STAs occupy different subcarriers in each group of subcarriers.

The value of Ng may be directly indicated by the AP by using the channel measurement notification message. For example, the AP indicates that Ng is equal to 2, 4, 8, 16, or the like. The value of Ng may alternatively be measured by the STA based on M and V, for example, Ng=⌈M/V⌉.

In the channel measurement method provided in this embodiment of the present invention, the AP sends the channel measurement notification message, to instruct one or more groups of STAs to send channel sounding signals, the channel sounding signal is a multicarrier signal, each group of STAs include two or more STAs, and subcarriers of a same sub-channel that are occupied by STAs in each group of STAs alternately and cyclically appear in frequency domain. In other words, STAs in a same group can learn, by sending channel sounding signals on some subcarriers of the same sub-channel, channel statuses of all subcarriers occupied by the STAs, so that the same group of STAs can simultaneously send the channel sounding signals on the same sub-channel. When there is more than one sub-channel, each group of STAs send channel sounding signals on different sub-channels at different time. Because each STA occupies one sub-channel in a same timeslot, not like the prior art, energy of the STA does not disperse on a plurality of sub-channels, and there is no energy dispersion. Therefore, a channel sounding message sent by each STA reaches the AP. Further, in the present invention, when one sub-channel is measured, all STAs indicated by the AP simultaneously send channel sounding signals on the sub-channel, or any group of STAs send channel sounding signals in a same timeslot. Alternatively, when a plurality of sub-channels are measured, a plurality of groups of STAs send channel sounding messages on different sub-channels in a same timeslot. Compared with the prior art, the present invention does not suggest that a plurality of STAs sequentially select idle sub-channels in a plurality of timeslots to send channel sounding signals. Instead, the present invention suggests that a plurality of STAs simultaneously send channel sounding signals on at least one sub-channel in a same timeslot. Therefore, compared with the prior art, the present invention can reduce time consumed by the STA to measure a sub-channel, thereby reducing UL channel measurement time.

The following describes an implementation in which an AP instructs a group of STAs to measure one sub-channel.

An embodiment of the present invention provides a channel measurement method.

As shown in FIG. 7, the method includes the following steps.

701. An AP sends a channel measurement notification message, where the channel measurement notification message includes a STA indication and a to-be-measured channel indication, the STA indication is used to indicate M STAs designated by the AP to participate in channel measurement, and the to-be-measured channel indication is used to indicate V to-be-measured sub-channels, where V=1.

The STA indication in the channel measurement notification message is used to indicate the STA designated by the AP to participate in channel measurement. Optionally, the channel measurement notification message may carry a list of STA IDs or a group identifier, or the STA designated by the AP to participate in channel measurement is indicated by using a bitmap and a start STA ID. For example, if the AP designates a STA 1 and a STA 2 as the STAs designated by the AP to participate in channel measurement, the channel measurement notification message may carry a list that includes STA IDs of the STA 1 and the STA 2; or the AP predefines that a first group of STAs include the STA 1 and STA 2, and then the AP adds a group identifier of the first group; or the AP adds a start STA ID and a bitmap. For example, if the start STA ID is 3 and bits of the bitmap are 0001101, a STA ID corresponding to a first bit in the bitmap is 3, and a STA corresponding to a bit whose value is 1 in the bitmap is the STA designated by the AP to participate in channel measurement. To be specific, STAs whose STA IDs are 6, 7, and 9 are the STAs designated by the AP to participate in channel measurement.

For the to-be-measured channel indication in the channel measurement notification message, refer to the implementation in step 601. For example, if bandwidth of the to-be-measured sub-channel is 40 MHz, it indicates that a 40 MHz channel including a primary channel is the to-be-measured channel.

In addition, because there are a plurality of precedent measurement methods in the prior art, the channel measurement notification message may further include a measurement type indication. The channel measurement notification message may carry the measurement type indication, so that the STA can distinguish between the channel measurement notification message in the present invention and a channel measurement notification message in the prior art based on the measurement type indication, to distinguish between the channel measurement method in the present invention and the channel measurement method in the prior art. For example, in the present invention, a frame type indication may be used to represent the measurement type indication; or an existing frame format of the channel measurement notification message may be reused, but an unused field in a Media Access Control (MAC) header is used to instruct to use the channel measurement method in the present invention.

702. The M STAs determine, based on the STA indication and Ng, locations occupied by the STAs in each group of subcarriers.

Ng is a size of a subcarrier group and indicates that every Ng consecutive subcarriers of channel sounding signals are divided into a group, and each STA in each group of STAs occupies a subcarrier at a fixed location in each group of subcarriers to send a signal. Ng cannot be less than a quantity of STAs included in one group of STAs. Ng may be carried in the channel measurement notification message, or may be determined based on M and V. If the measurement notification message sent by the AP includes only the STA indication, when V=1, by default, all the indicated STAs form one group of STAs to measure one sub-channel; and when the measurement notification message sent by the AP includes no Ng indication, by default, Ng is equal to the quantity M of STAs included in the group of STAs. When the AP indicates a value of Ng, Ng≥M, and in other words, each STA occupies one subcarrier in each group of subcarriers, and the group of subcarriers may include a subcarrier occupied by no STA.

Figure 8:
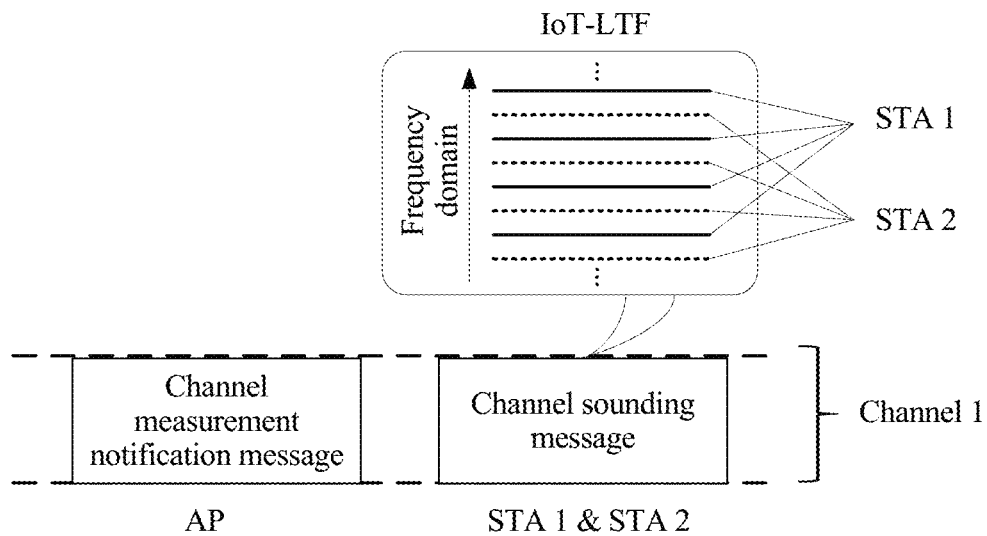
FIG. 8 is a schematic diagram of a subcarrier occupied by each STA when a group of STAs measure a sub-channel according to an embodiment of the present invention.
Figure 9:
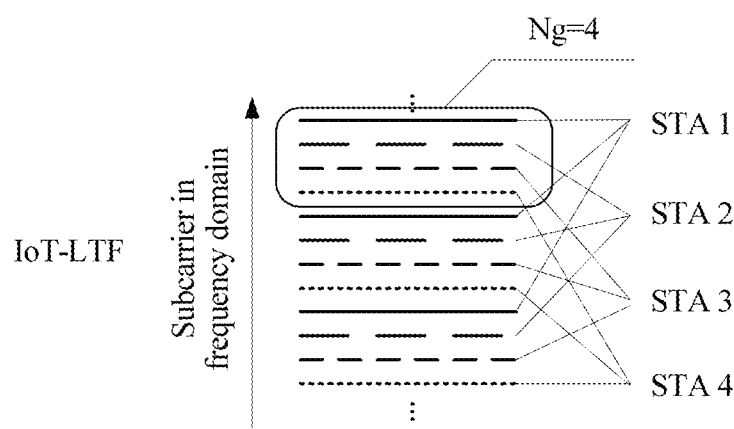
FIG. 9 is a schematic diagram of a subcarrier occupied by each STA when a group of STAs measure a narrowband sub-channel according to an embodiment of the present invention.

Specifically, a location of the STA in each group of subcarriers may be determined based on the STA ID in the STA indication. For example, as shown in FIG. 8, when Ng=2, M=2, and two STAs, namely a STA 1 and a STA 2 whose STA IDs are respectively 1 and 2, are instructed to send channel sounding signals, every two subcarriers are divided into one group, a channel sounding signal of the STA 1 whose STA ID is 1 may occupy a subcarrier with an odd number, and a channel sounding signal of the STA 2 whose STA ID is 2 may occupy a subcarrier with an even number. For another example, as shown in FIG. 9, when Ng=4, and four STAs, namely a STA 1, a STA 2, a STA 3, and a STA 4 whose STA IDs are respectively 1, 2, 3, and 4, are instructed to send channel sounding signals, every four subcarriers are divided into one group, and the STA 1 whose STA ID is 1 occupies a first subcarrier in each group, and to be specific, the STA 1 whose STA ID is 1 occupies subcarriers numbered 1, 5, 9, 13, . . . ; the STA 2 whose STA ID is 2 occupies a second subcarrier in each group, and to be specific, the STA 2 whose STA ID is 2 occupies subcarriers numbered 2, 6, 10, 14, . . . ; the STA 3 whose STA ID is 3 occupies a third subcarrier in each group, and to be specific, the STA 3 whose STA ID is 3 occupies subcarriers numbered 3, 7, 11, 15, . . . ; and the STA 4 whose STA ID is 4 occupies a fourth subcarrier in each group, and to be specific, the STA 4 whose STA ID is 4 occupies subcarriers numbered 4, 8, 12, 16, . . . . Certainly, Ng may be greater than the quantity M of STAs, and in this case, some subcarriers are kept idle and not used to transmit a signal. For example, if Ng=4 and the quantity of STAs is 3, every four subcarriers are divided into one group, and in each group of subcarriers, three STAs respectively occupy first three subcarriers, and a last subcarrier is idle. In 802.11ax, a maximum value of Ng is 16.

703. The M STAs simultaneously send channel sounding signals on the to-be-measured sub-channel.

In other words, the M STAs send carrier signals at occupied locations in each group of subcarriers on the to-be-measured sub-channel.

In a possible design, the channel measurement notification message may further include a channel power control indication, and the channel power control indication is used to instruct the STA to determine, based on the channel power control indication, transmit power of the channel sounding signal of the STA. The channel power control indication may indicate a received signal strength indicator (RSSI) of the channel sounding signal when the channel sounding signal reaches the AP, and the channel sounding signal is sent by the STA designated by the AP to participate in channel measurement; or the channel power control indication may directly indicate transmit power at which the STA to send the channel sounding signal.

For the RSSI indicating required signal strength of the channel sounding signal when the channel sounding signal sent by the STA designated by the AP to participate in channel measurement reaches the AP, in order that the STA can estimate a channel path loss between the STA and the AP and determine transmit power of the STA, the AP may further indicate, by using the channel measurement notification message, power at which the AP to send the channel measurement notification message, and the STA may calculate the channel path loss based on received signal strength of the channel measurement notification message and the power that is carried in the channel measurement notification message and that is used by the AP to send the channel measurement notification message. A path loss value plus the RSSI indicated by the AP is the transmit power at which the STA to send the channel sounding signal.

A function of the channel power control indication is to enable channel sounding signals simultaneously sent by a same group of STAs to have approximate signal strength when the channel sounding signals reach the AP, so that the AP receives the channel sounding signals sent by the plurality of STAs. This is because the channel sounding signals received by the AP may be distorted if the channel sounding signals sent by different STAs in the same group reach the AP with an excessively large strength difference. For example, a same group of STAs include a STA 1 and a STA 2, and strength of a channel sounding signal sent by the STA 1 is twice strength of a channel sounding signal sent by the STA 2. The receive end AP needs to amplify received channel sounding signals when processing the channel sounding signals of the STA 1 and the STA 2, and the AP end usually determines an amplification coefficient based on an average of total receive power. As a result, an amplification coefficient determined based on average receive power of the STA 1 and the STA 2 is excessively large for the STA 1. Consequently, an amplified signal of the STA 1 exceeds a processing range of the AP, and distortion of the channel sounding signal of the STA 1 is caused, thereby affecting channel measurement accuracy.

In a possible design, the channel measurement notification message may further include a quantity of symbols in a channel sounding signal IoT-LTF, and the quantity of symbols in the IoT-LTF is usually related to a quantity of antennas configured for the STA. In this embodiment, a plurality of STAs form one group to simultaneously send channel sounding signals on a same sub-channel, and the quantity of symbols in the IoT-LTF is determined by a maximum quantity of antennas in the group of STAs. For example, if a group of STAs include a STA 1, a STA 2, and a STA 3, a quantity of antennas of the STA 1 is 1, a quantity of antennas of the STA 2 is 2, and a quantity of antennas of the STA 3 is 4, a quantity of symbols in an IoT-LTF of each STA in the group of STAs is indicated to be 4. Herein, the quantity of symbols in the IoT-LTF is related to a maximum quantity of antennas in the group of STAs, and a channel sounding signal sent by a STA with a plurality of antennas is obtained by combining signals sent by the plurality of antennas. Therefore, if the AP needs to learn a channel status of each antenna, the STA needs to determine a quantity of symbols in an IoT-LTF in a channel sounding message based on a maximum quantity of antennas in a plurality of STAs, and a STA with antennas whose quantity is less the maximum quantity of antennas may repeatedly send IoT-LTF symbols, or send only IoT-LTF symbols whose quantity is corresponding to the quantity of antennas of the STA. Generally, if the maximum quantity of antennas is 1, the quantity of symbols in the IoT-LTF in the channel sounding message is 1; or if the maximum quantity Q of antennas is greater than 1, the quantity of symbols in the IoT-LTF in the channel sounding message is $\lceil Q/2 \rceil \times 2$, namely, a minimum even number that is not less than Q. For example, if the maximum quantity of antennas is 3, the quantity of symbols in the IoT-LTF is 4.

In a possible design, the channel measurement notification message may further include a symbol length indication of a channel sounding signal IoT-LTF, and a symbol length of the IoT-LTF also reflects a quantity of subcarriers included in unit bandwidth of the IoT-LTF. In current 802.11ax, three LTF sizes of 1×HE-LTF, 2×HE-LTF, and 4×HE-LTF are introduced. In given bandwidth, quantities of subcarriers included in the three LTF sizes are different, and time domain lengths of symbols are different. For example, if bandwidth of a sub-channel is 20 MHz, 1×HE-LTF includes 64 subcarriers, a length of each symbol is 3.2 μs when there is no guard interval (GI), and a GI length is usually fixed, but the GI length may alternatively be specified by the AP; 2×HE-LTF includes 128 subcarriers, and a length of each symbol is 6.4 μs when there is no GI; and 4×HE-LTF includes 256 subcarriers, and a length of each symbol is 12.8 μs when there is no GI. In the present invention, the symbol length indication of the channel sounding signal may be used to indicate the LTF size. Based on the symbol length indication of the channel sounding signal, the STA determines a symbol length of a to-be-sent IoT-LTF, and determines subcarriers that are to be occupied by the STA. For example, the channel measurement notification message indicates that there are four STAs, Ng=4, and if there is no guard subcarrier, when the symbol length indication of the channel sounding signal is 1×HE-LTF, a STA 1 occupies a total of 16 subcarriers: a first subcarrier, a fifth subcarrier, a ninth subcarrier, . . . , and a 61th subcarrier in 64 subcarriers; when the symbol length indication of the channel sounding signal is 2×HE-LTF, the STA 1 occupies a total of 32 subcarriers: a first subcarrier, a fifth subcarrier, a ninth subcarrier, . . . , and a 125th subcarrier in 128 subcarriers; and when the symbol length indication of the channel sounding signal is 4×HE-LTF, the STA 1 occupies a total of 64 subcarriers: a first subcarrier, a fifth subcarrier, a ninth subcarrier, . . . , and a 253th subcarrier in 256 subcarriers.

In a possible design, the channel measurement notification message may further include a carrier sense indication, and the carrier sense indication is used to indicate whether each of the M STAs that need to measure the channel determines, based on a channel sense result, whether to send the channel sounding signal. In this embodiment, after each STA in a group of STAs receives a carrier sense indication, if the carrier sense indication indicates that each STA in the group of STAs determines, based on a channel sense result, whether to send a channel sounding signal, whether the STA sends the channel sounding signal depends on the channel sense result, namely, whether the channel is idle, and each STA in the group of STAs sends the channel sounding signal when the channel is idle, otherwise, each STA in the group of STAs sends no channel sounding signal; or if the carrier sense indication indicates that each STA in the group of STAs does not determine, based on a channel sense result, whether to send a channel sounding signal, each STA in the group of STAs sends the channel sounding signal to the AP regardless of whether the channel is idle.

If the carrier sense indication indicates that each STA in the group of STAs determines, based on a channel carrier sense result, whether to send the channel sounding signal, whether the channel is idle is determined based on the channel sense result, and as a result, the group of STAs may include a STA that sends no channel sounding signal on the to-be-measured sub-channel. Channel carrier sense methods usually include clear channel assessment (CCA) of physical carrier sense, and virtual carrier sense (NAV). The CCA is directly sensing a channel for a period of time to determine whether the channel is idle. The NAV is used to determine, by using a channel occupation message sent by another device, whether a channel is idle. For the NAV, if a STA 1 receives, during sensing, a message sent by a device and the message indicates that the device is to occupy a channel 1 at a next moment, the STA 1 considers that the channel 1 is occupied at the next moment and is not idle. In this embodiment of the present invention, the channel carrier sense manner may include at least the CCA. For time when the STA performs the CCA, for example, a channel sense result obtained before the STA receives the channel measurement notification message may be used to determine whether the channel is idle. For example, a channel measurement result obtained during point coordination function interframe space (PCF (Point Coordination Function) Inter-frame Space, PIFS) or distributed coordination function interframe space (Distributed Inter-frame Spacing, DIFS) time close to the channel measurement notification message may be used to determine whether the channel is idle. Alternatively, a channel sense result obtained during an interframe space before the STA sends the channel sounding signal may be used to determine whether the channel is idle. For example, a channel measurement result obtained during short interframe space (Short Inter-frame Space, SIFS) time before the channel sounding signal is sent may be used to determine whether the channel is idle.

In this way, in this embodiment of the present invention, when the AP instructs a group of STAs to measure one sub-channel, the group of STAs simultaneously send channel sounding signals to the AP on the sub-channel, so that the AP measures the sub-channel. Channel measurement time is significantly reduced compared with that in the prior art in which STAs sequentially send channel sounding signals to an AP when measuring a sub-channel.

Figure 9A:
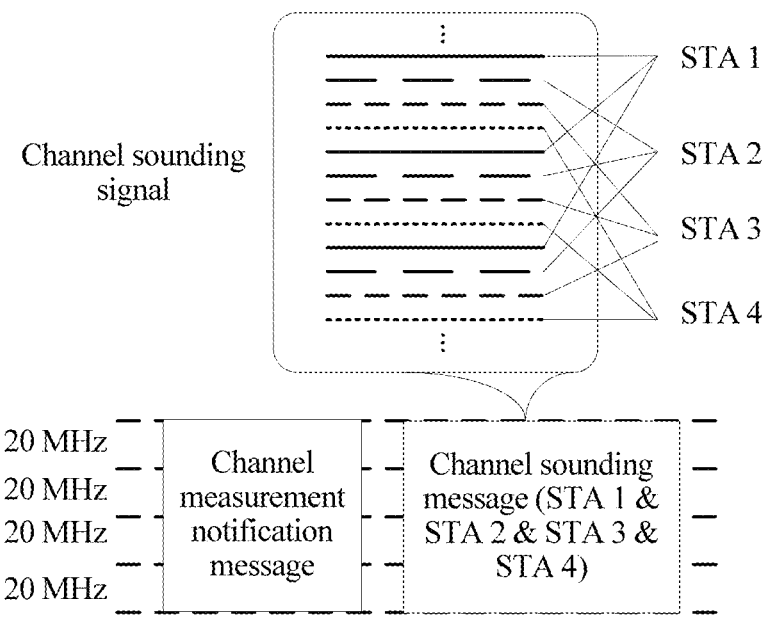
FIG. 9a is a schematic diagram of a subcarrier occupied by each STA when a group of STAs measure a wideband sub-channel according to an embodiment of the present invention.

It should be specially noted that when narrowband channel measurement is performed, the to-be-measured sub-channel in this embodiment is a narrowband channel, for example, a 2 MHz channel; and when wideband channel measurement is performed, the sub-channel in this embodiment may be a wideband channel, for example, an 80 MHz channel. For the wideband channel measurement, a specific example is shown in FIG. 9a, Ng=4, four STAs form one group to measure an 80 MHz channel, and a channel sounding signal IoT-LTF is sent on entire 80 MHz bandwidth. This embodiment may be easily extended to a case in which a plurality of groups of STAs measure one wideband channel, and to be specific, measurement is performed in different timeslots, each timeslot is corresponding to one group of STAs, and an IoT-LTF transmission manner of each group of STAs is the same as that in FIG. 9a.

Figure 9B:
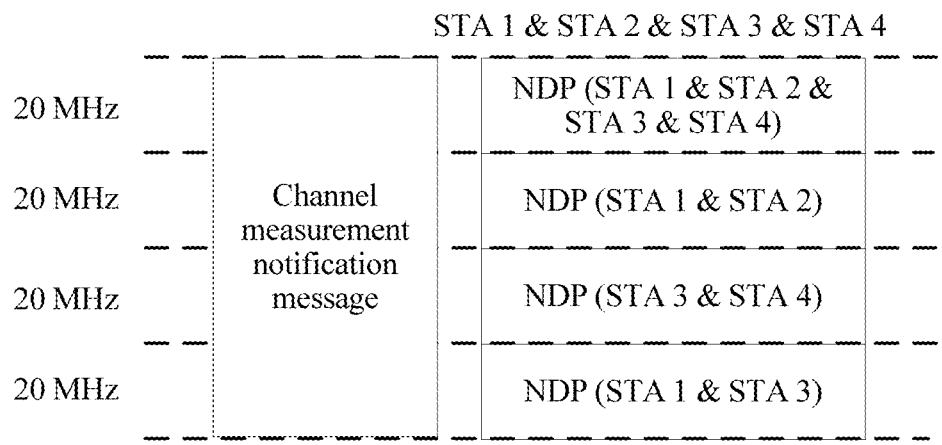
FIG. 9b is a schematic diagram of a subcarrier occupied by each STA when a group of STAs measure a wideband sub-channel according to an embodiment of the present invention.

For the foregoing embodiment, when each STA in the group of STAs is allowed to determine, based on a channel sense result of each 20 MHz channel, whether to send the channel sounding signal, as shown in FIG. 9b, when the STA determines, on each sub-channel, whether to send the channel sounding signal, if the STA determines to send the channel sounding signal, the STA occupies a corresponding subcarrier. For an 80 MHz channel, it is assumed that Ng=4, each 20 MHz channel includes 64 subcarriers, and there is no guard subcarrier. A sub-channel 1, a sub-channel 2, and a sub-channel 4 of a STA 1 are idle, and therefore, subcarriers 4n+1 (n=0 to 31, and 48 to 63) are occupied. A sub-channel 1 and a sub-channel 2 of a STA 2 are idle, and therefore, subcarriers 4n+2 (n=0 to 31) are occupied. A sub-channel 1, a sub-channel 3, and a sub-channel 4 of a STA 3 are idle, and therefore, subcarriers 4n+3 (n=0 to 15, and 32 to 63) are occupied. A sub-channel 1 and a sub-channel 4 of a STA 4 are idle, and therefore, subcarriers 4n+4 (n=0 to 15, and 31 to 47) are occupied.

The following describes an implementation in which an AP instructs a plurality of groups of STAs to measure one sub-channel.

An embodiment of the present invention provides a channel measurement method. As shown in FIG. 10, the method includes the following steps.

1001. An AP sends a channel measurement notification message, where the channel measurement notification message includes a STA indication, a to-be-measured channel indication, and a STA quantity indication of each group in W groups or a group quantity indication, the STA indication is used to indicate M STAs designated by the AP to participate in channel measurement, the to-be-measured channel indication is used to indicate V to-be-measured sub-channels, the STA quantity indication of each group is used to indicate a quantity N of STAs in each group when the M STAs that need to measure a channel are divided into the W groups, and the group quantity indication is used to indicate a quantity W of groups after the M STAs that need to measure the channel are divided into the groups, where M, V, W, and N are all positive integers, M≥2, V=1, W≥2, and N≥2.

In other words, the AP may further aggregate, to one channel measurement notification message for transmission, indication information instructing a plurality of groups of STAs to measure a same sub-channel at different time. For example, as shown in FIG. 11, the AP may aggregate, to one channel measurement notification message for transmission, indication information instructing three groups of STAs, namely, a STA 1 and a STA 2, a STA 3 and a STA 4, and a STA 5 and a STA 6, to measure a same sub-channel in different timeslots. In this case, a channel sounding message sending process is a simple repetition, in time domain, of a process in which a group of STAs measure a sub-channel and that is described in step 701 to step 703. A difference is that in this embodiment, channel sounding messages in different timeslots, namely, sending opportunities, are sent by different STA groups.

For implementations of the STA indication and the to-be-measured channel indication in the channel measurement notification message, refer to step 601 or step 701.

For example, if the STA indication indicates that a STA 1, a STA 2, a STA 3, and a STA 4 serve as STAs that are to perform measurement, and the to-be-measured channel indication indicates that a sub-channel 1 is a to-be-measured channel, the STA indication may carry a list of STA IDs that include identifiers of the STA 1, the STA 2, the STA 3, and the STA 4. It is assumed that the STA quantity indication of each group is 2 or the group quantity indication is 2. In this case, the STA 1 and STA 2 are a first group, and the STA 3 and the STA 4 are a second group. Generally, because each group needs to occupy one timeslot to send channel sounding signals, a quantity of sending timeslots of channel sounding signals is equal to a quantity of groups of STAs.

1002. The STA obtains a group to which the STA belongs and a location occupied by the STA in each group of subcarriers.

Specifically, the STA may obtain, based on the STA indication, the STA quantity indication of each group, and an identifier of the STA, the group to which the STA belongs and the location occupied by the STA in each group of subcarriers. The STA quantity indication of each group is used to indicate a quantity of several STAs included in each group of STAs. Based on the STA indication, the STA quantity indication of each group, and the identifier of the STA that is in the STA indication, the STAs may be divided into the groups, and a subcarrier that is occupied by each STA and that is in each group of subcarriers may be obtained through calculation. In this case, Ng and the STA quantity indication of each group may be considered as a same indication by default. For example, the channel measurement notification message sent by the AP includes a list of STA IDs, the list of STA IDs indicates that seven STAs are to perform channel measurement, and STA IDs of the seven STAs are respectively a STA 1, a STA 2, a STA 3, a STA 4, a STA 5, a STA 6, and a STA 7. An ID of each STA is a sequence number of the STA in the list, and the channel measurement notification message indicates that a quantity of STAs in each group is 3, and Ng=3 by default. The STA 4 is used as an example, the STA 4 is arranged in a fourth place in the list of STA IDs, and the STA 4 may perform a roundup operation based on the STA ID 4 and the quantity 3 of STAs in each group, to obtain a group to which the STA 4 belongs. To be specific, ⌈4/3⌉=2, and the STA 4 belongs to a second group. The STA 4 further performs a modulo operation based on the STA ID 4 and the quantity 3 of STAs in each group, to obtain a subcarrier occupied by the STA 4 in each group of subcarriers. To be specific, 4 mod3=1, and the STA 4 occupies a first subcarrier in each group of subcarriers. If the quantity of STAs indicated by the STA indication in the channel measurement notification message sent by the AP is not an integer multiple of the quantity of STAs in each group, only a last group needs to be specially processed, and another group is processed according to a preset rule. In this case, if there is no Ng indication in the channel measurement notification message sent by the AP, by default, Ng is equal to a maximum quantity of STAs included in each group of STAs. For example, if the quantity of STAs indicated by the channel measurement notification message sent by the AP is 5, and the quantity of STAs in each group is 2, it can be inferred that a total of ⌈5/2⌉=3 groups are obtained after division, both quantities of STAs in first two groups are ⌈5/3⌉=2, and a quantity of STAs in a last group is 5 mod2=1.

Alternatively, the STA may obtain, based on the STA indication, the group quantity indication, and an identifier of the STA, the group to which the STA belongs and the location occupied by the STA in each group of subcarriers. Based on the foregoing example of step 702, the STA IDs are respectively the STA 1, the STA 2, the STA 3, the STA 4, the STA 5, the STA 6, and the STA 7, and it is assumed that the group quantity indication is 3. In this case, the quantity of STAs in each group is ⌈7/3⌉=3, and Ng=3 by default. The STA 4 is used as an example. For the group to which the STA 4 belongs and the subcarrier occupied by the STA 4 in each group of subcarriers, refer to the foregoing example of step 702.

Alternatively, the STA may obtain, based on the STA indication, Ng, and an identifier of the STA, the group to which the STA belongs and the location occupied by the STA in each group of subcarriers. In this case, the quantity of STAs in each group is the same as a value of Ng by default. If the channel measurement notification message carries both the quantity of STAs in each group and the value of Ng, the STA obtains, based on the STA indication, the STA quantity indication of each group, and the identifier of the STA, the group to which the STA belongs and the location occupied by the STA in each group of subcarriers. The value of Ng may be greater than or equal to the quantity of STAs in each group. In this case, each group of subcarriers may include an unoccupied subcarrier.

When a plurality of groups of STAs measure a same channel in different timeslots, a group to which a STA belongs indicates a sending timeslot of the STA, and a specific location of the STA in the group indicates a subcarrier occupied by the STA in each group of subcarriers. The seven STAs are divided based on the identifiers of the STAs and the quantity 3 of STAs in each group. The STA 1, the STA 2, and the STA 3 whose identifiers are 1, 2, and 3 are a first group and send channel sounding signals in a first timeslot, a channel sounding signal of the STA 1 occupies a first subcarrier in each group of subcarriers, a channel sounding signal of the STA 2 occupies a second subcarrier in each group of subcarriers, and a channel sounding signal of the STA 3 occupies a third subcarrier in each group of subcarriers. The STA 4, the STA 5, and the STA 6 whose identifiers are 4, 5, and 6 are a second group and send channel sounding signals in a second timeslot, a channel sounding signal of the STA 4 occupies a first subcarrier in each group of subcarriers, a channel sounding signal of the STA 5 occupies a second subcarrier in each group of subcarriers, and a channel sounding signal of the STA 6 occupies a third subcarrier in each group of subcarriers. The STA 7 whose identifier is 7 is a third group and sends a channel sounding signal in a third timeslot, and the channel sounding signal of the STA 7 occupies a first subcarrier in each group of subcarriers.

1003. The STA obtains, based on the group to which the STA belongs, a symbol quantity of a channel sounding signal, a symbol length of the channel sounding signal, an interframe space between the channel measurement notification message and the channel sounding signal, and an interframe space between channel sounding signals, a sending moment at which the STA sends the channel sounding signal.

A symbol quantity of a channel sounding signal IoT-LTF is indicated by a symbol quantity indication of the channel sounding signal, and a symbol length of the channel sounding signal IoT-LTF is indicated by a symbol length indication. For implementations of the symbol quantity indication and the symbol length indication, refer to step 703.

In this embodiment, if the plurality of groups send channel sounding signals in different timeslots, after the timeslot in which the STA sends the channel sounding signal and the location that is of the subcarrier occupied by the STA and that is in each group of subcarriers are determined in step 702, the STA needs to determine a sending moment at which the STA specifically sends the channel sounding signal, in other words, a start moment of the timeslot of the STA. The sending moment is determined by the STA jointly based on the symbol quantity indication of the channel sounding signal and the symbol length indication of the channel sounding signal. When the AP instructs only one group of STAs to measure one channel, the STA does not need to determine the sending moment based on the symbol quantity indication of the channel sounding signal and the symbol length indication of the channel sounding signal, and the STA needs to learn only the interframe space between the channel measurement notification message and the channel sounding signal. When the AP instructs two or more groups of STAs to measure one or more channels in different timeslots, each STA in a next group of STAs that are to send channel sounding signals needs to calculate, based on the symbol quantity indication of the channel sounding signal and the symbol length indication of the channel sounding signal, duration used for channel sounding messages of current groups of STAs that send channel sounding signals, and the STA may obtain a sending moment of the STA by adding up the duration, the interframe space between the channel measurement notification message and the channel sounding signal, and the interframe space between adjacent channel sounding signals. The interframe space between adjacent channel sounding signals usually has a predefined length, for example, an SIFS. In the channel sounding message, only a length of the channel sounding signal is variable, and duration of another part of the channel sounding message other than the channel sounding signal is fixed. Therefore, duration of the entire channel sounding message can be calculated so long as the symbol quantity of the channel sounding signal and duration of each symbol are learned.

For example, when the AP instructs two groups of STAs to measure one channel, the symbol length indication of the channel sounding signal is 1×HE-LTF, and if there is no guard subcarrier, a first group of STAs include a STA 1 and a STA 2, the STA 1 has one antenna, the STA 2 has two antennas, a second group of STAs include a STA 3 and a STA 4, the STA 3 has one antenna, and the STA 4 has one antenna. The first group of STAs do not need to calculate a sending moment, and only need to send channel sounding signals at an interval of one interframe space between the channel measurement notification message and the channel sounding signal. The second group of STAs need to calculate a sending moment of the second group of STAs. First, a symbol length of the channel sounding signals of the first group is 3.2 μs in time domain. A quantity of channel sounding signals of the first group is a maximum quantity 2 of antennas. Therefore, the first group of STAs use a total of 3.2×2=6.4 μs to send the channel sounding signals, and duration of a channel sounding message of the first group of STAs may be determined. In this way, the sending moment of the second group of STAs is equal to an interframe space between the channel measurement notification message and the channel sounding message plus the duration of the channel sounding message of the first group of STAs and an interframe space between two channel sounding signals.

1004. The STA sends the channel sounding signal to the AP.

The STA sends the channel sounding signal to the AP at the occupied location in each group of subcarriers at the determined sending moment.

In addition, the channel measurement notification message may further include a channel power control indication, and before the STA sends the channel sounding signal, the STA may determine, based on the channel power control indication, power at which the STA to send the channel sounding signal. For an implementation in which each STA in each group of STAs determines transmit power of sending the channel sounding signal, refer to step 703.

The channel measurement notification message may further include a carrier sense indication, and before the STA sends the channel sounding signal, each STA in each group of STAs may determine, based on the carrier sense indication, whether to send the channel sounding signal based on a channel sense result. For a specific implementation in which each STA determines, based on the carrier sense indication, whether to send the channel sounding signal based on the channel sense result, refer to step 703.

In this embodiment, if a plurality of groups of STAs measure a same sub-channel, the groups of STAs may use a common value (in other words, for a same parameter, the AP indicates only one value by using the channel measurement notification message) of each of Ng, the channel power control indication, the symbol length indication, and the symbol quantity indication, or different values (in other words, for a same parameter, the AP indicates a plurality of values by using the channel measurement notification message, and each value is corresponding to one group of STAs) of each of Ng, the channel power control indication, the symbol length indication, and the symbol quantity indication may be set for the groups of STAs. In a possible design, Ng and the channel power control indication may be set to common values, the symbol quantity indication may be separately set for each group of STAs, and the symbol length indication may be set to a common value or may be separately set for each group of STAs.

Therefore, when the AP instructs a plurality of groups of STAs to measure one sub-channel, the plurality of groups of STAs send channel measurement signals in different timeslots, and each group of STAs simultaneously send channel sounding signals to the AP on the sub-channel, so that the AP measures the sub-channel. Channel measurement time is significantly reduced compared with that in the prior art in which STAs sequentially send channel sounding signals to an AP when measuring a sub-channel.

The following describes an implementation in which a plurality of groups of STAs measure a plurality of sub-channels.

An embodiment of the present invention provides a channel measurement method.

As shown in FIG. 12, the method includes the following steps.

1201. An AP sends a channel measurement notification message, where the channel measurement notification message includes a STA indication, a to-be-measured channel indication, and a STA quantity indication of each group in W groups or a group quantity indication, the STA indication is used to indicate M STAs designated by the AP to participate in channel measurement, the to-be-measured channel indication is used to indicate V to-be-measured sub-channels, the STA quantity indication of each group is used to indicate a quantity N of STAs in each group when the M STAs that need to measure a channel are divided into the W groups, and the group quantity indication is used to indicate a quantity W of groups after the M STAs that need to measure the channel are divided into the groups, where M, V, W, and N are all positive integers, M≥2, V≥2, W≥2, and N≥1.

A difference from the foregoing embodiment is that when the plurality of groups of STAs measure the plurality of sub-channels, the channel measurement notification message in this embodiment may further include a timeslot quantity S, and the timeslot quantity S indicates that the AP allocates S timeslots to the plurality of groups of STAs, and is used to instruct the plurality of groups of STAs to measure the V sub-channels in the S timeslots, and V≥S≥1. When S<V, it indicates that not all groups of STAs need to measure all sub-channels. This further reduces a quantity of sending timeslots of channel sounding signals, and therefore, this further reduces time consumed for a channel measurement process. When the channel measurement notification message carries no timeslot quantity indication, the timeslot quantity S may be determined based on the quantity V of to-be-measured sub-channels. In this case, S=V, in other words, there are a total of V sending timeslots by default, and each group of STAs perform traversal measurement on all the V sub-channels.

1202. The M STAs obtain groups to which the STAs belong and locations occupied by the STAs in each group of subcarriers.

For an implementation of step 1202, refer to step 1002.

It can be learned from step 1002 that the quantity of STAs in each group is obtained after a total quantity of STAs in the STA indication is divided by a STA group quantity and a result of the division is rounded up. The STA group quantity may be equal to the quantity of to-be-measured sub-channels, and therefore, the STA group quantity may be implicitly indicated by the to-be-measured channel indication. Because the STA quantity indication of each group and Ng may be a same indication, in this embodiment, a difference from step 1001 is that the channel measurement notification message may carry no STA quantity indication of each group and no Ng, or may carry no STA group quantity and no Ng, and the STA group quantity or the quantity of STAs in each group, and Ng may be obtained through inference using the to-be-measured channel indication V and the total quantity of STAs. For example, it is assumed that there are a total of M STAs, and the quantity of to-be-measured sub-channels is V. In this case, the STA group quantity is V, and the STA group quantity N=Ng=⌈M/V⌉. A quantity of STAs in a last group may be less than N, and is MmodV.

1203. Each STA in the M STAs sends a channel sounding signal to the AP on any sub-channel at a location occupied by the STA in each group of subcarriers, where in a same timeslot, a group to which the STA belongs simultaneously sends channel sounding signals on a same sub-channel, and the W groups simultaneously send channel sounding signals on different sub-channels; and in different timeslots, a same group is located on different sub-channels, and W≥S≥1.

Figure 13:
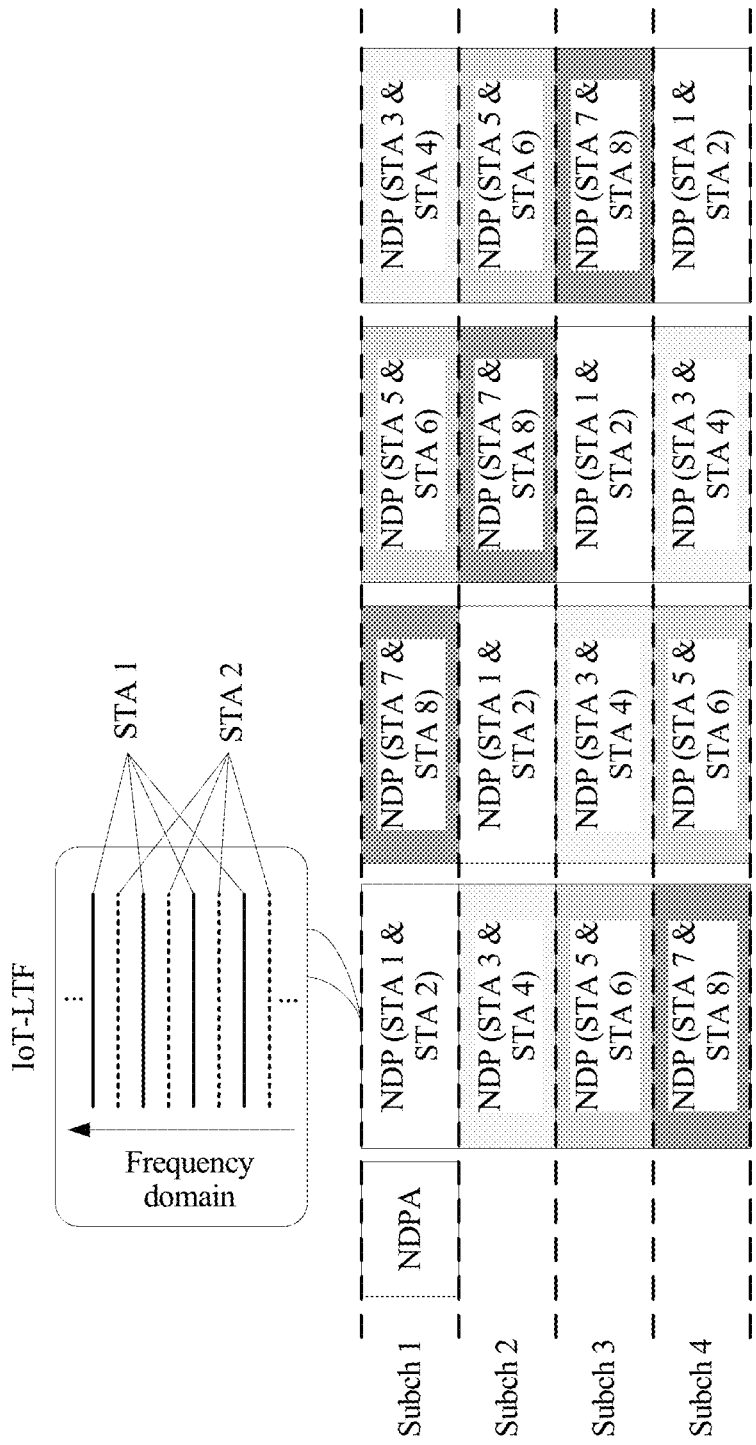
FIG. 13 is a schematic diagram of message sending when a plurality of groups of STAs measure a plurality of sub-channels in a plurality of timeslots according to an embodiment of the present invention.

Specifically, when the AP instructs the plurality of groups of STAs to measure the plurality of channels, each group of STAs need to send channel sounding signals in the plurality of timeslots. In a same timeslot, different groups of STAs occupy different sub-channels to simultaneously send channel sounding signals. A same group of STAs occupy different sub-channels in different sending timeslots. As shown in FIG. 13, the AP instructs eight STAs to measure four sub-channels, the STAs may be divided into four groups, each group includes two STAs, and the two STAs in the group always send channel sounding signals simultaneously. A channel sounding signal sending process is divided into a total of four timeslots, and N does not exceed the quantity of sub-channels. As shown in FIG. 13, N=2. In a first timeslot, the four groups of STAs respectively occupy the four sub-channels. In a second timeslot, the four groups of STAs are cyclically shifted by one sub-channel based on the first timeslot. In a third timeslot, the four groups of STAs are cyclically shifted by one sub-channel based on the second timeslot. In a fourth timeslot, the four groups of STAs are cyclically shifted by one sub-channel based on the third timeslot. After the foregoing process, the AP can measure a channel status of each sub-channel occupied by each STA. In addition to the method in which the STAs are cyclically shifted based on the sub-channels in different timeslots, another method may be used so long as the groups of STAs are arranged, in the same timeslot, in a sequence that can be learned by the AP and the same group of STAs occupy different sub-channels in different timeslots. For example, the AP instructs four groups of STAs to measure four channels arranged in descending order of frequency domain. In a first timeslot, the four groups of STAs whose group identifiers are 1, 2, 3, and 4 are arranged in an order of [1 2 3 4] on the four sub-channels; in a second timeslot, an order is [4 3 2 1]; in a third timeslot, an order is [2 4 1 3]; and in a fourth timeslot, an order is [3 1 4 2].

For an implementation in which each group of STAs send channel sounding signals on any sub-channel, refer to step 1002 to step 1004 in the foregoing embodiment.

Figure 14:
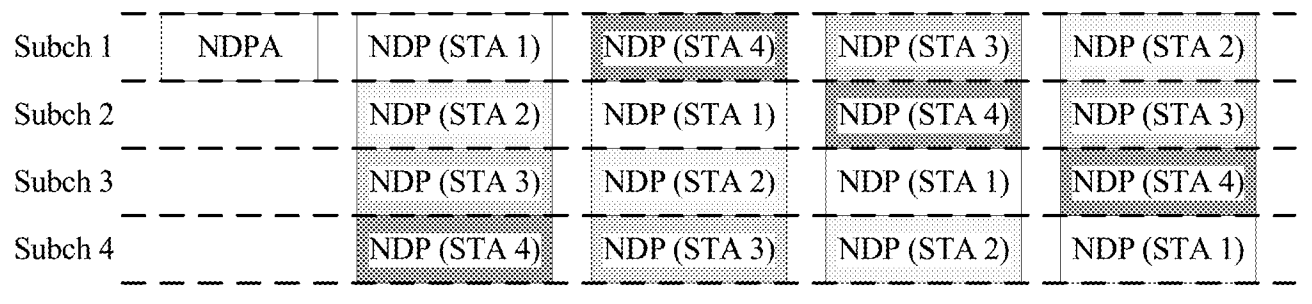

In addition, when the to-be-measured channel indication indicates a plurality of to-be-measured sub-channels, the indicated to-be-measured sub-channels may be consecutive or inconsecutive. For example, the to-be-measured channel indication indicated by the AP is [20 MHz, 100110001], which is used to instruct to measure four inconsecutive sub-channels: a first sub-channel, a fourth sub-channel, a fifth sub-channel, and a ninth sub-channel in a 20 MHz channel. For example, if a sub-channel number list is used to indicate to-be-measured channels, as shown in FIG. 14, the AP carries a sub-channel number list that includes numbers of a sub-channel 1, a sub-channel 3, and a sub-channel 4, indicating that the to-be-measured channels are the sub-channel 1, the sub-channel 3, and the sub-channel 4. In this case, a sub-channel 2 does not need to be measured. Additionally, in addition to bandwidth, bandwidth+bitmap, and the sub-channel number list, the to-be-measured channel indication may use a method of start sub-channel number +end sub-channel number. To be specific, all sub-channels whose numbers are between the two numbers need to be measured. For example, the AP indicates that numbers of the to-be-measured sub-channels are 2+6. To be specific, the AP indicates that five consecutive sub-channels numbered 2, 3, 4, 5, and 6 are the to-be-measured sub-channels.

Figure 15:
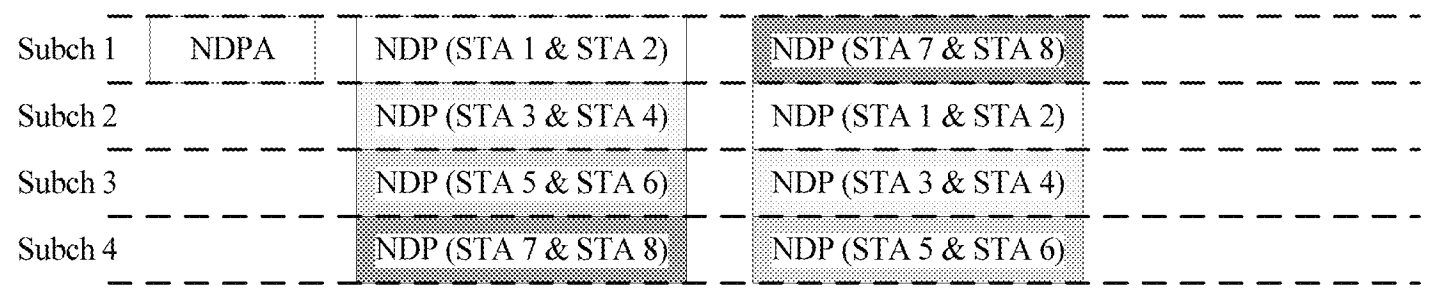

In addition, the timeslot quantity indication of the channel sounding signal indicates a total quantity of sending timeslots of channel sounding signals after the AP sends the channel measurement notification message. To perform traversal measurement on statuses of all sub-channels occupied by all the STAs, the quantity of sending timeslots of channel sounding signals should be equal to the quantity of to-be-measured sub-channels. However, in some cases, not all the sub-channels need to be measured. In this case, S is less than V. In one case, instead of an optimal channel resource, only a channel resource available for the STA needs to be found. Therefore, the STA needs to measure only some sub-channels. In this case, the AP needs to set the quantity of sending timeslots of channel sounding signals, and the AP may determine a specific setting value based on historical experience. In another case, the STA reports general channel availability of the STA before receiving the channel measurement notification message, and some sub-channels are unavailable. Therefore, the STA does not need to measure all sub-channels in the channel measurement process. Further, the AP indicates a quantity of timeslots of channel sounding messages that is less than the quantity of sub-channels, to reduce the quantity of sending timeslots of channel sounding messages, thereby shortening time consumed for channel measurement. As shown in FIG. 15, a quantity of to-be-measured channels is 4, a STA group quantity is 4, and there are two sending timeslots of channel sounding signals.

Figure 16:
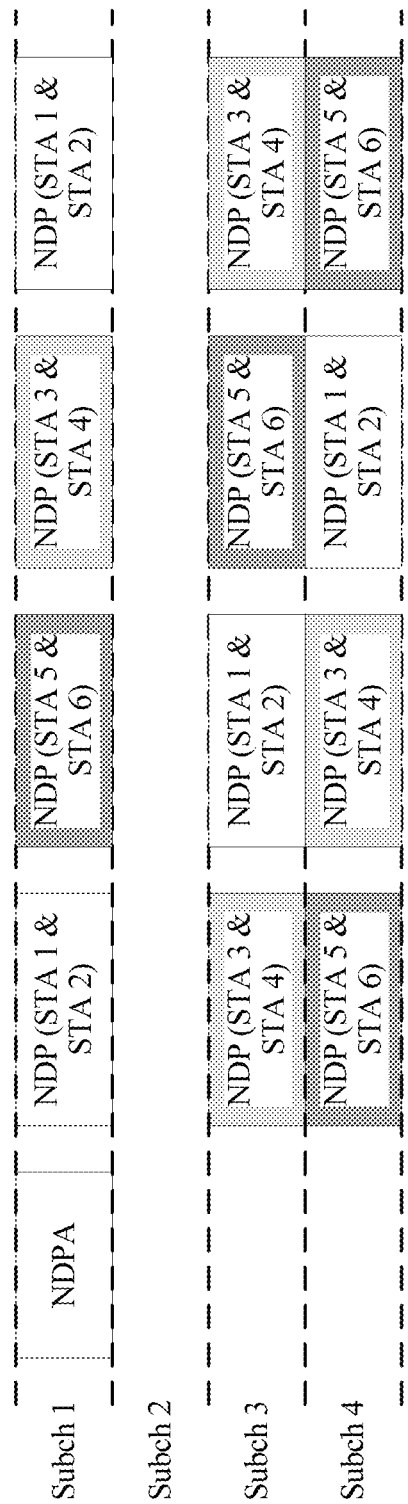
FIG. 16 is a schematic diagram of message sending when a plurality of groups of STAs measure a plurality of sub-channels in a plurality of timeslots according to an embodiment of the present invention.

In a possible design, when Ng=1, each STA is a group, and to be specific, a group of STAs include only one STA. In this case, after sending a channel sounding signal, each STA immediately switches to another sub-channel and sends a channel sounding signal. Therefore, an interframe space between the channel measurement notification message and the channel sounding signal, and an interframe space between adjacent channel sounding signals should ensure that the STA can complete the foregoing channel switching process. For example, four STAs respectively send channel sounding signals on four different channels in a same timeslot. As shown in FIG. 16, for one STA, the channel sounding signals sent by the STA occupy different sub-channels in different timeslots.

In this embodiment, the groups of STAs always perform transmission on different sub-channels simultaneously. Therefore, a symbol quantity of an IoT-LTF and a symbol length of the IoT-LTF should be set to common values. In other words, these parameters of the groups of STAs should be the same in a same timeslot, to simplify an implementation. Certainly, in different sending timeslots, symbol quantity indications of the IoT-LTF may be different, and symbol lengths of the IoT-LTF may be different. However, to simplify implementation, it is recommended that a same symbol quantity of the IoT-LTF and a same symbol length of the IoT-LTF are used in all the timeslots.

In this embodiment, the groups of STAs always perform transmission on different sub-channels simultaneously. Therefore, a channel power control indication should be set to be a common value. In other words, channel power control indications of the groups of STAs should be the same in a same timeslot, to simplify an implementation. Certainly, channel power control indications may be different in different sending timeslots. However, to simplify implementation, it is recommended that a same channel power control indication is used in all the timeslots.

Figure 17:
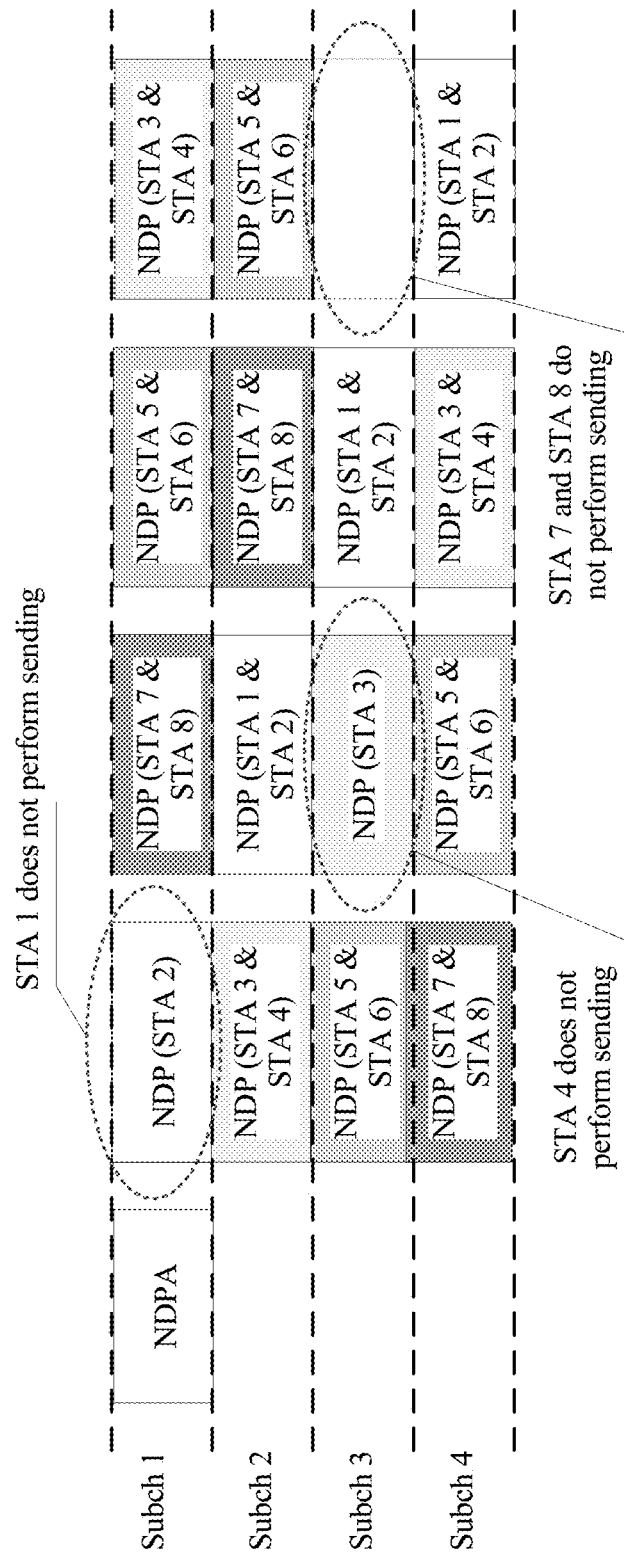
FIG. 17 is a schematic diagram of message sending when a plurality of groups of STAs measure a plurality of sub-channels in a plurality of timeslots according to an embodiment of the present invention.

In this embodiment, the channel measurement notification message may carry a carrier sense indication. To be specific, in any sending timeslot, any STA in each group of STAs may determine, based on the carrier sense indication, whether to send the channel sounding signal based on a channel sense result. For a specific implementation of the carrier sense indication, refer to step 603. When the carrier sense indication indicates that a channel sounding message is sent based on a carrier sense result, each STA independently determines, in each timeslot, whether to send the channel sounding message. To be specific, a same STA may send a channel sounding signal in a timeslot and may send no channel sounding signal in another timeslot. For example, as shown in FIG. 17, when determining the indication of sending the channel sounding message based on the carrier sense result, before sending a channel sounding signal in a timeslot 1, a STA 1 senses that a channel 1 is not idle, and therefore, the STA 1 sends no channel sounding signal on the channel 1 in the timeslot 1. Similarly, a STA 4 senses, in a timeslot 2, that a channel 3 is busy, and therefore, the STA 4 sends no channel sounding signal on the channel 3 in the timeslot 2. A reason why a STA 7 and a STA 8 send no channel sounding signal on the channel 3 in a timeslot 4 is the same as that in the above.

In the foregoing embodiments shown in FIG. 6, FIG. 7, FIG. 10, and FIG. 12, in addition to a channel sounding signal, the channel sounding message further includes some other information. In this embodiment of the present invention, channel sounding messages of a same group of STAs are simultaneously sent on a same sub-channel, and this means that channel sounding signals in the channel sounding messages are transmitted on the same sub-channel, but this does not indicate a limitation that an entire channel sounding message frame is sent on the same sub-channel. Because the channel sounding message frame may be implemented in different formats, some fields in the channel sounding message frame may be sent on a wider channel. An example is as follows:

Format 1: A channel sounding message frame is a channel sounding message frame carrying a 20 MHz physical header.

Figure 18:
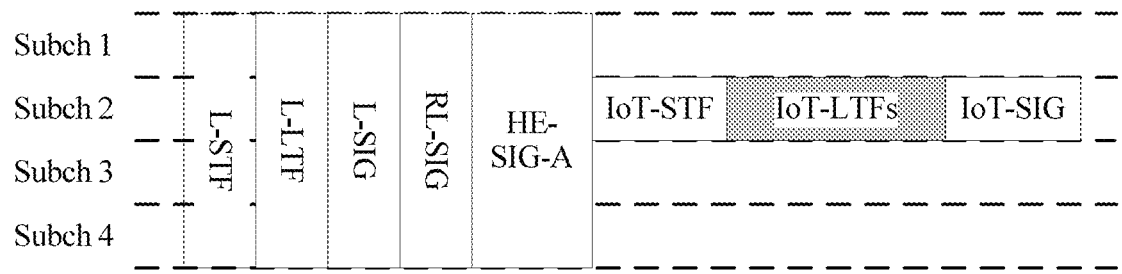
FIG. 18 is a schematic diagram of a message frame format of a channel sounding message according to an embodiment of the present invention.
Figure 19:
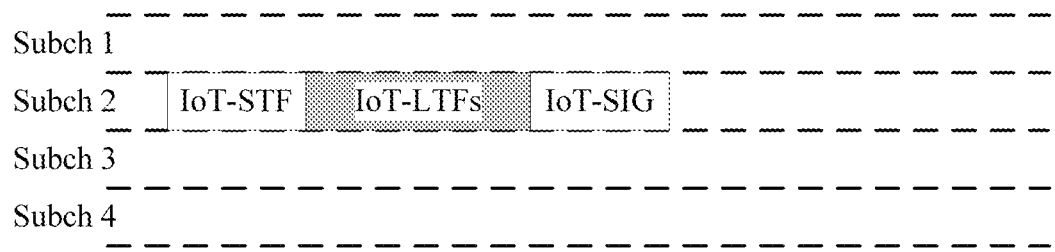
FIG. 19 is a schematic diagram of a message frame format of a channel sounding message according to an embodiment of the present invention.

FIG. 18 shows a channel sounding message frame that is designed based on a current 802.11ax frame format and that is transmitted on a narrowband. A legacy short training field (L-STF), a legacy long training field (L-LTF), and a legacy signal (L-SIG) field constitute a legacy preamble, and the legacy preamble is used for backward compatibility. The backward compatibility enables another 802.11 device or apparatus on a to-be-measured channel to determine, based on the legacy preamble, that a sent channel sounding message is a WiFi frame instead of noise, indicating that the channel is occupied. The another 802.11 device or apparatus should perform CCA by using a relatively low sense threshold, to avoid, as far as possible, using the channel during sending of the channel sounding message. A repeated legacy signal (Repeated L-SIG, RL-SIG) field and a high efficiency signal field A (High Efficiency Signal A, HE-SIG-A) may not exist, or are replaced with other SIG fields. When the channel sounding message has no 20 MHz header, transmission overheads of the channel sounding message are smaller, but this is not conducive to the backward compatibility.

In this embodiment, when the plurality of groups of STAs measure the plurality of sub-channels, different groups of STAs occupy different sub-channels in a same timeslot to simultaneously send channel sounding messages, and a same group of STAs occupy different sub-channels in different timeslots. Compared with the prior art in which STAs send channel sounding signals on all idle sub-channels in different timeslots when a plurality of STAs measure a plurality of sub-channels, the present invention can make energy of the STA not dispersed, so that the channel sounding signal can reach the AP and can be transmitted over a longer distance. The present invention is suitable for uplink channel measurement of long-distance transmission. In addition, compared with the prior art in which a plurality of STAs sequentially send channel sounding signals to an AP, the present invention can greatly reduce channel measurement time, because a plurality of STAs are divided into groups and simultaneously send channel sounding signals. In other words, the present invention can be used to resolve a problem that the AP cannot receive, in a UL channel measurement process, the channel sounding signal sent by the STA and a problem that time overheads of a UL channel measurement execution process are high.

The foregoing mainly describes the solutions provided in the embodiments of the present invention from a perspective of the AP and the STA. It may be understood that, to achieve the foregoing functions, either of the AP and the STA includes a corresponding hardware structure and/or software module for implementing each function. A person of ordinary skill in the art should be easily aware that, the algorithm steps described with reference to the embodiments disclosed in this specification may be implemented by hardware or a combination of hardware and computer software in the present invention. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, the AP and the STA may be divided into function modules based on the foregoing method examples. For example, each function module may be obtained through division for a corresponding function, or two or more functions may be integrated into one processing module. The integrated module may be implemented in a form of hardware, or may be implemented in a form of a function module of software. It should be noted that the module division in the embodiments of the present invention is an example, and is merely logical function division. There may be another division manner in an actual implementation.

Figure 20:
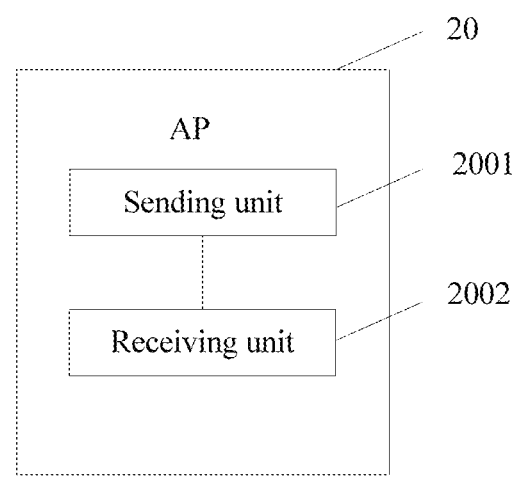
FIG. 20 is a schematic structural diagram of an AP according to an embodiment of the present invention.

When each function module is obtained through division for each corresponding function, FIG. 20 is a possible schematic structural diagram of an AP 20 used in the foregoing embodiment. The AP 20 includes a sending unit 2001 and a receiving unit 2002. The sending unit 2001 is configured to support the AP in performing the process 601 in FIG. 6, the process 701 in FIG. 7, the process 1001 in FIG. 10, or the process 1201 in FIG. 12. The receiving unit 2002 is configured to support the AP in performing the process 602 in FIG. 6, the process 702 and the process 703 in FIG. 7, the process 1002 to the process 1004 in FIG. 10, or the process 1202 and the process 1203 in FIG. 12. All related content of each step in the foregoing method embodiment may be cited in function descriptions of a corresponding function module, and details are not described herein.

Figure 21:
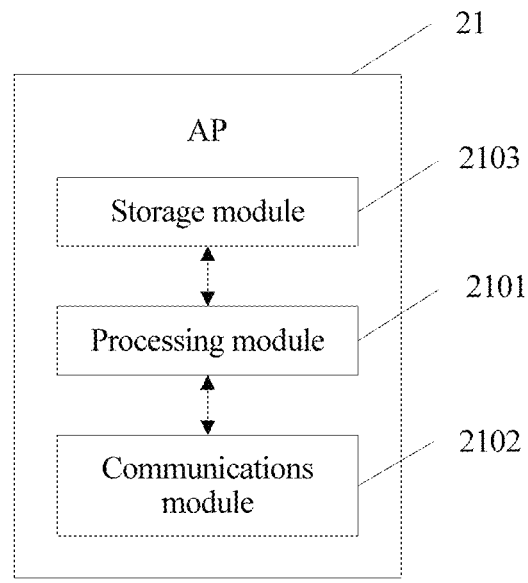
FIG. 21 is a schematic structural diagram of an AP according to an embodiment of the present invention.

When an integrated unit is used, FIG. 21 is a possible schematic structural diagram of an AP used in the foregoing embodiment. An AP 21 includes a processing module 2101 and a communications module 2102. The processing module 2101 is configured to control and manage an action of the AP. For example, the processing module 2101 is configured to support the AP in performing the process 601 in FIG. 6, the process 701 in FIG. 7, the process 1001 in FIG. 10, or the process 1201 in FIG. 12. The communications module 2102 is configured to support the AP in communicating with another network entity, for example, sending a channel measurement notification message to the STA and receiving a channel sounding signal sent by the STA. The AP may further include a storage module 2103. The storage module 2103 is configured to store program code and data of the AP. For example, the storage module 2103 is configured to store a file and the like related to the channel sounding signal in this embodiment of the present invention.

The processing module 2101 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 2101 may implement or execute various example logical blocks, modules, and circuits that are described with reference to the content disclosed in the present invention. The processor may also be a combination that implements a computing function, for example, a combination of one or more microprocessors or a combination of a DSP and a microprocessor. The communications module 2102 may be a transceiver, a transceiver circuit, a communications interface, or the like. The storage module 2103 may be a memory.

Figure 22:
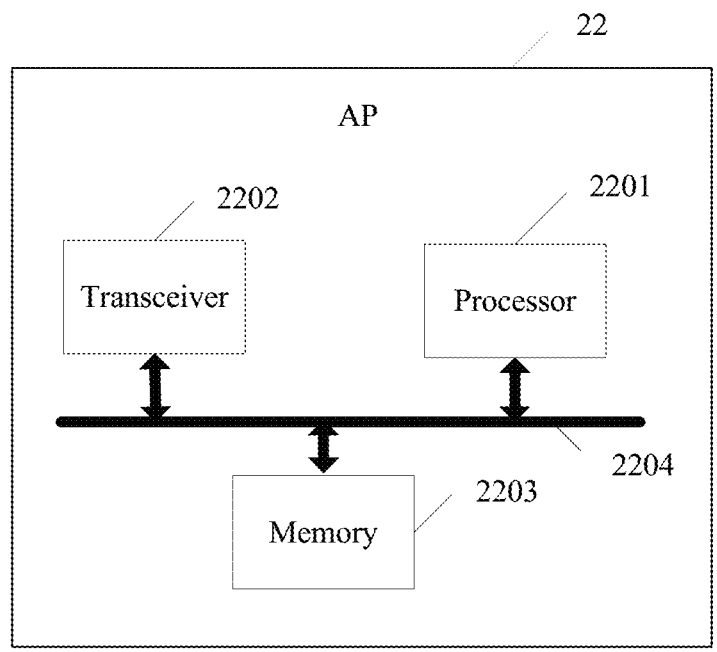
FIG. 22 is a schematic structural diagram of an AP according to an embodiment of the present invention.

When the processing module 2101 is a processor, the communications module 2102 is a transceiver, and the storage module 2103 is a memory, the terminal in this embodiment of the present invention may be an AP shown in FIG. 22.

As shown in FIG. 22, the AP 22 includes a processor 2201, a transceiver 2202, a memory 2203, and a bus 2204. The transceiver 2202, the processor 2201, and the memory 2203 are interconnected by using the bus 2204. The bus 2204 may be a peripheral component interconnect (PCI) bus, or an extended industry standard architecture (EISA) bus, or the like. The bus may be categorized as an address bus, a data bus, a control bus, or the like. For ease of indication, the bus is indicated by using only one bold line in FIG. 22. However, it does not indicate that there is only one bus or only one type of bus.

Figure 23:
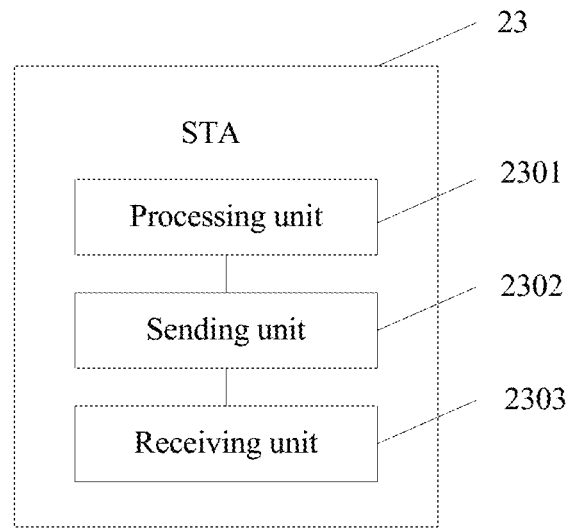
FIG. 23 is a schematic structural diagram of a STA according to an embodiment of the present invention.

When each function module is obtained through division for each corresponding function, FIG. 23 is a possible schematic structural diagram of a STA 23 used in the foregoing embodiment. The STA includes a processing unit 2301, a sending unit 2302, and a receiving unit 2303. The processing unit 2301 is configured to support the STA in performing the process 602 in FIG. 6, the process 702 in FIG. 7, the process 1002 and the process 1003 in FIG. 10, or the process 1202 in FIG. 12. All related content of each step in the foregoing method embodiment may be cited in function descriptions of a corresponding function module, and details are not described herein.

Figure 24:
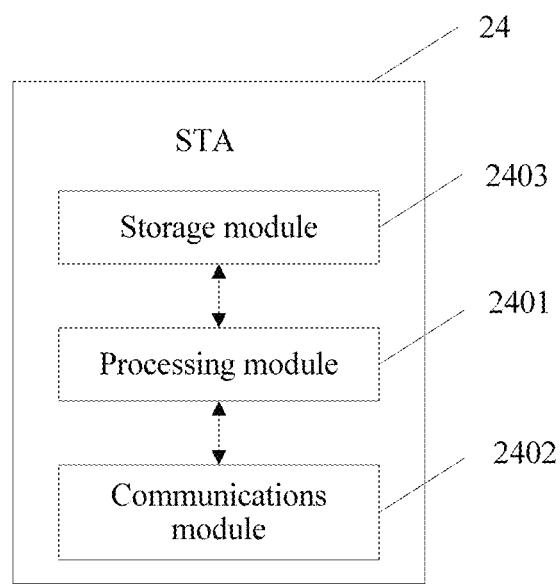
FIG. 24 is a schematic structural diagram of a STA according to an embodiment of the present invention.

When an integrated unit is used, FIG. 24 is a possible schematic structural diagram of a STA used in the foregoing embodiment. A STA 24 includes a processing module 2401 and a communications module 2402. The processing module 2401 is configured to control and manage an action of the STA. For example, the processing module 2401 is configured to support the STA in performing the process 602 in FIG. 6, the process 702 in FIG. 7, the process 1002 and the process 1003 in FIG. 10, or the process 1202 in FIG. 12. The communications module 2402 is configured to support the terminal in communicating with another network entity, for example, sending a channel sounding signal to the AP and receiving a channel measurement notification message sent by the AP. The STA may further include a storage module 2403. The storage module 2403 is configured to store program code and data of the STA. For example, the storage module 2403 is configured to store a file and the like of the channel notification message in this embodiment of the present invention.

The processing module 2401 may be a processor or a controller, for example, may be a central processing unit CPU, a general purpose processor, a digital signal processor DSP, an application-specific integrated circuit ASIC, a field programmable gate array FPGA or another programmable logic device, a transistor logic device, a hardware component, or any combination thereof. The processing module 2401 may implement or execute various example logical blocks, modules, and circuits that are described with reference to the content disclosed in the present invention. The processor may also be a combination that implements a computing function, for example, a combination of one or more microprocessors or a combination of a DSP and a microprocessor. The communications module 2402 may be a transceiver, a transceiver circuit, a communications interface, or the like. The storage module 2403 may be a memory.

Figure 25:
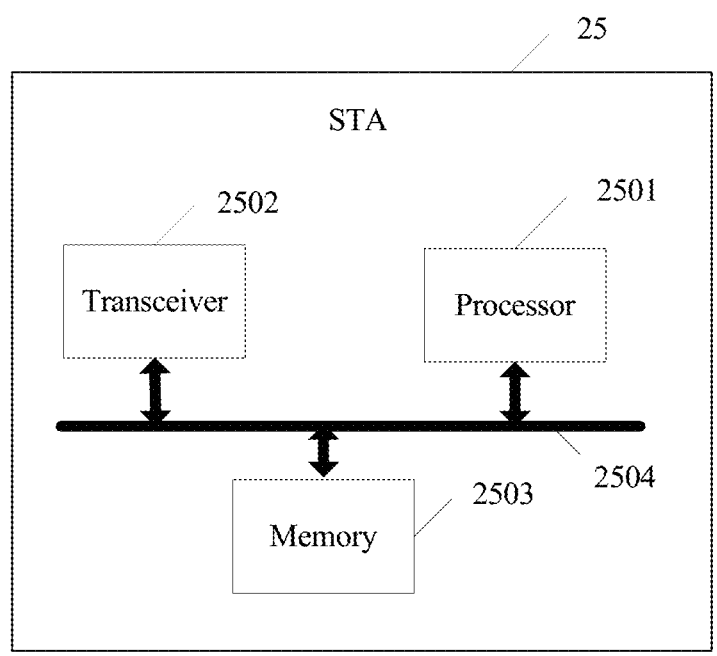
FIG. 25 is a schematic structural diagram of a STA according to an embodiment of the present invention.

When the processing module 2401 is a processor, the communications module 2402 is a transceiver, and the storage module 2403 is a memory, the terminal in this embodiment of the present invention may be a STA shown in FIG. 25.

As shown in FIG. 25, the STA 25 includes a processor 2501, a transceiver 2502, a memory 2503, and a bus 2504. The transceiver 2502, the processor 2501, and the memory 2503 may be interconnected by using the bus 2504. The bus 2504 may be a peripheral component interconnect (PCI) bus, or an extended industry standard architecture EISA bus, or the like. The bus may be categorized as an address bus, a data bus, a control bus, or the like. For ease of indication, the bus is indicated by using only one bold line in FIG. 25. However, it does not indicate that there is only one bus or only one type of bus.

The methods or algorithm steps described with reference to the content disclosed in the present invention may be implemented in a hardware manner, or may be implemented in a manner of executing a software instruction by a processor. The software instruction may include a corresponding software module. The software module may be stored in a random access memory (Random Access Memory, RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in a core network interface device. Certainly, the processor and the storage medium may exist in the core network interface device as discrete components.

A person skilled in the art should be aware that in one or more of the foregoing examples, the functions described in the present invention may be implemented by using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general or dedicated computer.

The objectives, technical solutions, and benefit effects of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. An access point (AP), comprising:
 a transmitter, configured to send a channel measurement notification message, wherein the channel measurement notification message comprises a station (STA) indication and a to-be-measured channel indication, the STA indication indicates M STAs designated by the AP to participate in channel measurement, and the to-be-measured channel indication indicates V to-be-measured sub-channels; and a receiver, configured to receive a plurality of channel sounding signals sent by the M STAs, wherein the M STAs designated by the AP to participate in channel measurement are divided into W groups, each group of the W groups comprises N respective STAs, in each group of the W groups the respective N STAs in the respective group simultaneously send channel sounding signals of the plurality of channel sounding signals on a same respective sub-channel in the V to-be-measured sub-channels, each channel sounding signal of the plurality of channel sounding signals comprises a plurality of subcarriers, wherein in each channel sounding signal of the plurality of channel sounding signals every respective Ng consecutive subcarriers is a respective group of subcarriers, wherein in each group of the W groups each of the respective N STAs in the respective group occupies a respective subcarrier at a fixed location in each group of subcarriers, and in each group of the W groups subcarriers that are occupied by the respective N STAs in the respective group and that are in a same group of subcarriers are different from each other;

wherein M, W, V, N, and Ng are all positive integers, M≥N≥2, W≥1, V≥1, Ng≥N, and a value of Ng is comprised in the channel measurement notification message or is determined based on M and V.

2. The AP according to claim 1, wherein:
the channel measurement notification message further comprises:
a STA quantity indication of each group in the W groups, wherein the STA quantity indication of each group in the W groups indicates indicate a quantity N of STAs in each group of the W groups when the M STAs designated by the AP to participate in channel measurement are divided into the W groups; or
a group quantity indication, wherein the group quantity indication indicates a quantity W of groups after the M STAs designated by the AP to participate in channel measurement are divided into the W groups.

3. The AP according to claim 1, wherein V=1, and the receiver is configured to:
receive the plurality of channel sounding signals sent by the M STAs on a same sub-channel in different timeslots, wherein each timeslot is corresponds to a different group of the W groups, and a quantity of timeslots is W.

4. The AP according to claim 1, wherein V≥2 and M=N, and the receiver is configured to:
receive the plurality of channel sounding signals simultaneously sent by the M STAs on the V sub-channels.

5. The AP according to claim 1, wherein W≥2 and W=V, and the receiver is configured to:
receive the plurality of channel sounding signals sent by the M STAs in S timeslots, wherein the M STAs simultaneously send the plurality of channel sounding signals in a same timeslot by occupying different sub-channels, each group of the W groups occupies a different sub-channel in a different timeslot, and W≥S≥1.

6. The AP according to claim 5, wherein the channel measurement notification message further comprises a quantity S of timeslots.

7. The AP according to claim 1, wherein:
the channel measurement notification message further comprises a channel power control indication, and the channel power control indication indicates:
a power at which each STA of the M STAs in each group of the W groups sends a respective channel sounding signal of the plurality of channel sounding signals; or
an expected signal strength of a respective channel sounding signal sent by each STA in each group when the respective channel sounding signal reaches the AP.

8. The AP according to claim 1, wherein the channel measurement notification message further comprises a symbol quantity indication, and the symbol quantity indication indicates a quantity of symbols comprised in each channel sounding signal sent by each of the M STAs that need to measure the channel.

9. The AP according to claim 1, wherein the channel measurement notification message further comprises a symbol length indication of the channel sounding signal, and the symbol length indication is used to indicate a time domain length of each symbol comprised in each channel sounding signal sent by each of the M STAs designated by the AP to participate in channel measurement.

10. The AP according to claim 1, wherein the channel measurement notification message further comprises a carrier sense indication, and the carrier sense indication indicates whether each of the M STAs will determine, based on a channel sense result, whether to send a respective channel sounding signal.

11. The AP according to claim 1, wherein a symbol comprised in each of the plurality of channel sounding signals is an orthogonal frequency division multiplexing (OFDM) symbol.

12. A station (STA), comprising:
a receiver, configured to receive a channel measurement notification message sent by an access point (AP), wherein the channel measurement notification message comprises a STA indication and a to-be-measured channel indication, the STA indication indicate M STAs designated by the AP to participate in channel measurement, and the to-be-measured channel indication indicates V to-be-measured sub-channels; and
a transmitter, configured to send a channel sounding signal of a plurality of channel sounding signals, wherein the STA is comprised in a first group of W groups, the M STAs designated by the AP to participate in channel measurement are divided into the W groups, each group of the W groups comprises N respective STAs, in each group of the W groups the respective N STAs in the respective group simultaneously send channel sounding signals of the plurality of channel sounding signals on a same respective sub-channel in the V to-be-measured sub-channels, each channel sounding signal of the plurality of channel sounding signals comprises a plurality of subcarriers, wherein in each channel sounding signal of the plurality of channel sounding signals every Ng consecutive subcarriers is a respective group of subcarriers, wherein in each group of the W groups each of the respective N STAs in the respective group occupies a respective subcarrier at a fixed location in each group of subcarriers, and in each group of the W groups subcarriers that are occupied by the respective N STAs in the respective group and that are in a same group of subcarriers are different from each other;

wherein M, W, V, N, and Ng are all positive integers, M≥N≥2, W≥1, V≥1, Ng≥N, and a value of Ng is comprised in the channel measurement notification message or is determined based on M and V.

13. The STA according to claim 12, wherein the channel measurement notification message further comprises:
    a STA quantity indication of each group in the W groups, wherein the STA quantity indication of each group in the W groups indicates a quantity N of STAs in each group of the W groups when the M STAs designated by the AP to participate in channel measurement are divided into the W groups; or
    a group quantity indication, and the group quantity indication indicates a quantity W of groups after the M STAs designated by the AP to participate in channel measurement are divided into the W groups.

14. The STA according to claim 13, wherein V=1, and the STA further comprises a processor, and the processor is configured to obtain a group to which the STA belongs and a location occupied by the STA in each group of subcarriers, wherein the processor is configured to obtain the group to which the STA belongs and the location occupied by the STA in each group of subcarriers according to:
    the STA indication, a quantity W of the W groups, and an identifier of the STA; or
    an indication of each STA designated by the AP to participate in channel measurement, a quantity of STAs in each group of the W groups after the M STAs designated by the AP to participate in channel measurement are divided into the W groups, and an identifier that is of the STA and that is in the indication of each STA designated by the AP to participate in channel measurement; or
    the STA indication, Ng, and an identifier of the STA.

15. The STA according to claim 14, wherein V=1, and the processor is further configured to:
    obtain, based on the group to which the STA belongs, a symbol quantity of each channel sounding signal of the plurality of channel sounding signals, a symbol length of each channel sounding signal of the plurality of channel sounding signals, an interframe space between the channel measurement notification message and a first channel sounding signal of the plurality of channel sounding signals, and an interframe space between adjacent channel sounding signals of the plurality of channel sounding signals, a sending moment at which the STA sends a respective channel sounding signal at the occupied location in each group of subcarriers.

16. The STA according to claim 14, wherein W≥2 and W=V, the STA corresponds to S sending timeslots, and the transmitter is configured to:
    send the channel sounding signal of the plurality of channel sounding signals, wherein the STA is located on different sub-channels in the S different sending timeslots, the channel sounding signal of the plurality of channel sounding signals is sent to the AP on any sub-channel at the location occupied by the STA in each group of subcarriers;
    wherein in a same timeslot, the group to which the STA belongs simultaneously sends channel sounding signals on a same sub-channel, and the W groups simultaneously send channel sounding signals on different sub-channels, and in different timeslots, a same group is located on different sub-channels, and W≥S≥1.

17. The STA according to claim 16, wherein the channel measurement notification message further comprises a timeslot quantity indication, and the timeslot quantity indication indicates that the STA corresponds to the S sending timeslots.

18. The STA according to claim 12, wherein the transmitter is configured to:
    determine, based on the STA indication and Ng, a location occupied by the STA in each group of subcarriers.

19. The STA according to claim 12, further comprising a processor, wherein:
    the channel measurement notification message further comprises a carrier sense indication, and the carrier sense indication indicates whether each of the M STAs will determine, based on a channel sense result, whether to send the channel sounding signal; and
    the processor is configured to:
        when the carrier sense indication indicates that each of the M STAs will determine, based on the channel sense result, whether to send the channel sounding signal, before the STA receives the channel measurement notification message, or before the STA sends the channel sounding signal to the AP, perform the following:
        sense whether any subchannel in the V to-be-measured sub-channels are idle; and
        when the STA senses that any sub-channel in the V to-be-measured sub-channels is idle, determine to send the respective channel sounding signal to the AP on the any sub-channel; or
        when the STA senses that no sub-channel in the V to-be-measured sub-channels is not idle, determine to skip sending the respective channel sounding signal to the AP.

20. The STA according to claim 12, wherein the channel measurement notification message further comprises a symbol quantity indication and a symbol length indication, the symbol quantity indication indicates a quantity of symbols comprised in each channel sounding signal sent by each of the M STAs, and the symbol length indication indicates a time domain length of each symbol comprised in each channel sounding signal sent by each of the M STAs.

21. The STA according to claim 12, wherein the channel measurement notification message further comprises a channel power control indication, and the channel power control indication indicates:
    a power at which each STA in each group sends a respective channel sounding signal; or
    an expected signal strength of a respective channel sounding signal sent by each STA in each group when the respective channel sounding signal reaches the AP.

* * * * *